(12) United States Patent
Perez

(10) Patent No.: US 7,522,975 B2
(45) Date of Patent: *Apr. 21, 2009

(54) OPEN ARCHITECTURE MODULARITY FOR IRRIGATION CONTROLLERS

(75) Inventor: Sergio Perez, San Diego, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/838,862

(22) Filed: Aug. 14, 2007

(65) Prior Publication Data
US 2008/0071426 A1 Mar. 20, 2008

Related U.S. Application Data

(63) Continuation of application No. 10/687,352, filed on Oct. 15, 2003, now Pat. No. 7,257,465.

(60) Provisional application No. 60/418,894, filed on Oct. 15, 2002.

(51) Int. Cl.
G05D 11/00 (2006.01)
(52) U.S. Cl. .......................... 700/284; 239/69
(58) Field of Classification Search ......... 700/283–284; 239/69, 70
See application file for complete search history.

(56) References Cited

U.S. PATENT DOCUMENTS 3,869,854 A 3/1975 Church
3,942,077 A 3/1976 Powers
4,016,407 A 4/1977 Mesecar
4,090,764 A 5/1978 Malsby
4,152,750 A 5/1979 Bremenour (Continued)

FOREIGN PATENT DOCUMENTS

WO WO 02058254 A1 7/2002
WO WO 2004046872 A2 6/2004

OTHER PUBLICATIONS

Durda, "Serial and URAT Tutorial", http://www.freebsd.org/doc/en_IS.ISO8859-1/articles/serial-uart/article.sgml, Jan. 13, 1996, pp. 1-32, vol. 1.13, FreeBSD.

(Continued)

*Primary Examiner*—Kidest Bahta
(74) *Attorney, Agent, or Firm*—Fitch, Even, Tabin & Flannery

(57) ABSTRACT

Modular irrigation controllers and related methods are described herein. In one implementation, an irrigation controller comprises a control unit within a housing, the control unit including a first microcontroller for executing stored irrigation programs. The controller also comprises a plurality of module coupling locations, each electrically coupled with the first microcontroller and adapted to receive one of a plurality of expansion modules. The first microcontroller is configured to detect the electrical coupling and decoupling of an expansion module to a respective module coupling location without removing power to the control unit, the expansion module including a second microcontroller capable of communicating with said first microcontroller and including driver circuitry for actuating irrigation valves, the second microcontroller capable of operating the driver circuitry for actuating said irrigation valves in accordance with control signals received from the first microcontroller.

20 Claims, 16 Drawing Sheets

U.S. PATENT DOCUMENTS

| | | | |
|---|---|---|---|
| 4,204,201 A | 5/1980 | Williams | |
| 4,242,721 A | 12/1980 | Krolak | |
| 4,244,022 A | 1/1981 | Kendall | |
| 4,250,563 A | 2/1981 | Struger | |
| 4,442,504 A | 4/1984 | Dummermuth | |
| 4,569,020 A | 2/1986 | Snoddy | |
| 4,672,510 A | 6/1987 | Castner | |
| 4,771,374 A | 9/1988 | Ropelato | |
| 4,790,762 A | 12/1988 | Harms | |
| 4,845,380 A | 7/1989 | Plegari | |
| 4,852,051 A | 7/1989 | Mylne | |
| 4,870,863 A | 10/1989 | Duncan | |
| 4,882,702 A | 11/1989 | Struger | |
| 4,920,453 A | 4/1990 | Onose | |
| 4,922,407 A | 5/1990 | Birk | |
| 4,937,732 A | 6/1990 | Brundisini | |
| 4,937,746 A | 6/1990 | Brundisini | |
| 5,000,692 A | 3/1991 | Taniguchi | |
| 5,097,861 A | 3/1992 | Hopkins | |
| 5,262,936 A | 11/1993 | Faris | |
| 5,265,005 A | 11/1993 | Schmidt | |
| 5,278,749 A | 1/1994 | DeMan | |
| 5,287,888 A | 2/1994 | Geiger | |
| 5,293,554 A | 3/1994 | Nicholson | |
| 5,479,338 A | 12/1995 | Ericksen | |
| 5,602,728 A | 2/1997 | Madden | |
| 5,748,466 A | 5/1998 | McGivern | |
| 5,956,248 A * | 9/1999 | Williams et al. | 700/16 |
| 6,088,621 A | 7/2000 | Woytowitz | |
| 6,230,089 B1 * | 5/2001 | Lonn et al. | 701/48 |
| 6,314,340 B1 * | 11/2001 | Mecham et al. | 700/284 |
| 6,402,048 B1 | 6/2002 | Collins | |
| 6,453,215 B1 | 9/2002 | Lavoie | |
| 6,459,959 B1 | 10/2002 | Williams | |
| 6,708,084 B2 | 3/2004 | Battistutto | |
| 6,721,630 B1 | 4/2004 | Woytowitz | |
| 6,763,287 B2 | 7/2004 | Brundisini | |
| 6,766,221 B1 | 7/2004 | Christiansen | |
| 6,772,050 B2 | 8/2004 | Williams | |
| 6,834,662 B1 | 12/2004 | Olson | |
| 6,842,667 B2 | 1/2005 | Beutler | |
| 6,850,819 B1 | 2/2005 | Townsend | |
| 6,996,457 B2 | 2/2006 | Williams | |
| 7,069,115 B1 | 6/2006 | Woytowitz | |
| 7,181,319 B1 | 2/2007 | Woytowitz | |
| 7,257,465 B2 | 8/2007 | Perez | |
| 2002/0091452 A1 | 7/2002 | Addink | |
| 2002/0183898 A1 | 12/2002 | Williams | |
| 2003/0182022 A1 | 9/2003 | Addink | |
| 2004/0236443 A1 | 11/2004 | Ware | |
| 2004/0254685 A1 | 12/2004 | Williams | |
| 2005/0004715 A1 | 1/2005 | Christiansen | |
| 2005/0038529 A1 | 2/2005 | Perez | |
| 2005/0055106 A1 | 3/2005 | Beutler | |
| 2005/0119797 A1 | 6/2005 | Marian | |
| 2005/0143842 A1 | 6/2005 | Marian | |
| 2005/0267641 A1 | 12/2005 | Nickerson | |
| 2006/0080002 A1 | 4/2006 | Williams | |

OTHER PUBLICATIONS

Hunter Industries, "About Hunter: A Corporate Chronology", http://www.hunterindustries.com/Corporate/About_Hunter/about_02.html, Dec. 1, 2004, pp. 1-2, Hunter Industries Incorporated, San Marcos, CA.

Hunter Industries, "Hunter ICC Controllers", Sep. 1, 2002, pp. 1-2, Hunter Industries Incorporated, San Marcos, CA.

Hunter Industries, "Hunter Pro-C Controllers", Jun. 1, 2002, pp. 1-2, Hunter Industries Incorporated, San Marcos, CA.

Hunter Industries, "ICC Commercial Irrigation Controllers, Owner's Manual and Installation", Apr. 1, 2002, pp. 1-34, Hunter Industries Incorporated, San Marcos, CA.

Hunter Industries, "ICC Controllers, Institutional Series Controllers for Heavy Duty Residential and Commercial Applications", Nov. 1, 2002, pp. 1-22, Hunter Industries Incorporated, San Marcos, CA.

Hunter Industries, "Modular Controllers Mean You'll Always Have 'The Right Controller For Every Job'", http://www.hunterindustries.com/Resources/Library/Product/200210_hdln_modular.html, Dec. 1, 2004, pp. 1-3, Hunter Industries Incorporated, San Marcos, CA.

Hunter Industries, Pro-C Controller, A Complete Family of Full-Featured Residential and Light Commercial Controllers, Mar. 1, 2002, pp. 1-32, Hunter Industries Incorporated, San Marcos, CA.

Hunter Industries, "Pro-C Residential and Light Commercial Irrigation Controllers, Owner's Manual and Installation Instructions", Nov. 1, 2000, pp. 1-34, Hunter Industries Incorporated, San Marcos, CA.

Motorola, "Communications Sector, IRRInet I/O Module 4 Digital Inputs/ 16 Solid-State Outputs", Jan. 1, 1992, p. 25, Technical Writing Services, Motorola, Inc., Schaumburg, IL.

Motorola, "Irrigation Field Unit Owner's Manual", Jan. 1, 1992, T.O.C. & Sections 1-3, Technical Writing Services, Motorola, Inc., Schaumburg, IL.

Motorola, "IRRInet—Trunked Radio Satellite, Bidding Specifications", Dec. 14, 1992, p. 1, Megeath.

Motorola, "IRRInet Component Descriptions", Feb. 16, 1993, p. 6.

Motorola, "IRRInet CPU Module—Service Manual", Jan. 1, 1992, p. 22, Technical Writing Services, Motorola, Inc., Schaumburg, IL.

Motorola, "IRRInet General Description Service Manual", Jan. 1, 1993, Technical Writing Services, Motorola, Inc., Schaumburg, IL.

Motorola, "Line and Second Radio Board: Parts List and Connectors", p. 2, Technical Writing Services, Motorola, Inc., Schaumburg, IL.

Motorola, "MIR 5000 System Planner", Mar. 8, 1993, T.O.C. & pp. 1-42, The Toro Company, Riverside, CA.

Motorola, "MIR 5000C System Installation Section", Jan. 1, 1989, p. 23, Technical Writing Services, Motorola Communications Israel Ltd., Tel Aviv, Israel.

Motorola, "MIR 5000F—Trunked Radio Satellite", Dec. 14, 1992, p. 2, Megeath.

Motorola, "MIR5000C Central System Operating Instructions", Jan. 1, 1991, p. 12, Technical Writing Services, Motorola, Inc., Schaumburg, IL.

Motorola, "MIR5000C Quickstart and Reference Guide", Feb. 1, 1994, Technical Writing Services, Motorola, Inc., Schaumburg, IL.

Motorola, "Motorola MIR 5000 System Features", Nov. 1, 1991, p. 20, San Diego Turf and Irrigation, San Diego, CA.

Motorola, "Motorola MIR-5000 Component Descriptions," Feb. 16, 1993, p. 3.

Motorola, "New Members to the MIR5000 Family, Irrinet and Scorpio", p. 14, The Toro Company, Riverside, CA.

Motorola, "Scorpio AC—Installation Instructions", Jan. 1, 1993, p. 23, Technical Writing Services, Motorola, Inc., Schaumburg, IL.

Motorola, "Scorpio, Bidding Specifications", Jan. 6, 1993, p. 3.

Motorola, "Scorpion AC", Sep. 1, 1994, T.O.C. and Sections 1-3, Technical Writing Services, Motorola, Inc., Schaumburg, IL.

Motorola, "Scorpion DC—Installation", Sep. 1, 1994, p. 17, Technical Writing Services, Motorola, Inc., Schaumburg, IL.

Motorola, "Scorpion DC Operation", Sep. 1, 1994, p. 17, Technical Writing Services, Motorola, Inc., Schaumburg, IL.

PCT; App. No. PCT/US04/434731 Written Opinion of the International Searching Authority mailed Aug. 31, 2005; 7 pages.

PCT; App. No. PCT/US04/43473; International Search Report mailed Aug. 31, 2005; 5 pages.

Rain Bird, "Central Computer Control System, Maxicom, Landscape Irrigation Products, 1993-1994", pp. 98-99, Rain Bird Corporation, Glendora, CA.

Rain Bird, "Central Control System, Maxicom—Guide to Operations", Feb. 1, 1993, pp. 5.4-1-2; 5.4-41-42; 4.2-1-2, Rain Bird Sales, Inc., Tucson, AZ.

Rain Bird, "Central Control System", Maxicom, Jun. 1, 1994, pp. 2-8, Rain Bird Sales, Inc., Tucson, AZ.

Rain Bird, "Components of the Maxicom System", Feb. 9, 1994, p. 32, Section 3, Rain Bird Corporation, Glendora, CA.

Rain Bird, "Installation and Operation Guide, Controller Unit IM", Apr. 1, 2002, pp. 82-86, Rain Bird Corporation, Glendora, CA.

Rain Bird, "Maxicom Guide to Operations," pp. Ch. 7, Oct. 1, 1994, Rain Bird Corporation, Glendora, CA.

Rain Bird, "Rain Bird—Landscape Irrigation: Products: IM Series Controllers", http://web.archive.org/web/20030203155244/www.rainbird.com/landscape/products/controllers/im.htm, Feb. 5, 2003, pp. 1-4, Rain Bird Corporation, Glendora, CA.

The Strong Box, "Stainless Steel Controller Enclosure", Jan. 1, 1991, p. 10, V.I.T. Products, Inc., San Diego, CA.

Toro & Motorola, "General Description—IRRInet", p. 24, The Toro Company, Riverside, CA.

Toro, "Motorola MIR 5000 Radio-Based Irrigation Central Computer Control System", Jan. 1, 1991, pp. 1-4, The Toro Company, Riverside, CA.

USPTO; U.S. Appl. No. 10/687,352; Advisory Action mailed Dec. 18, 2006.

USPTO; U.S. Appl. No. 10/687,352; Interview Summary mailed Dec. 18, 2006.

USPTO; U.S. Appl. No. 10/687,352; Notice of Allowance mailed Apr. 5, 2007.

USPTO; U.S. Appl. No. 10/687,352; Interview Summary mailed Apr. 5, 2007.

USPTO; U.S. Appl. No. 10/687,352; Office Action mailed Feb. 24, 2006.

USPTO; U.S. Appl. No. 10/687,352; Office Action mailed Aug. 8, 2006.

* cited by examiner

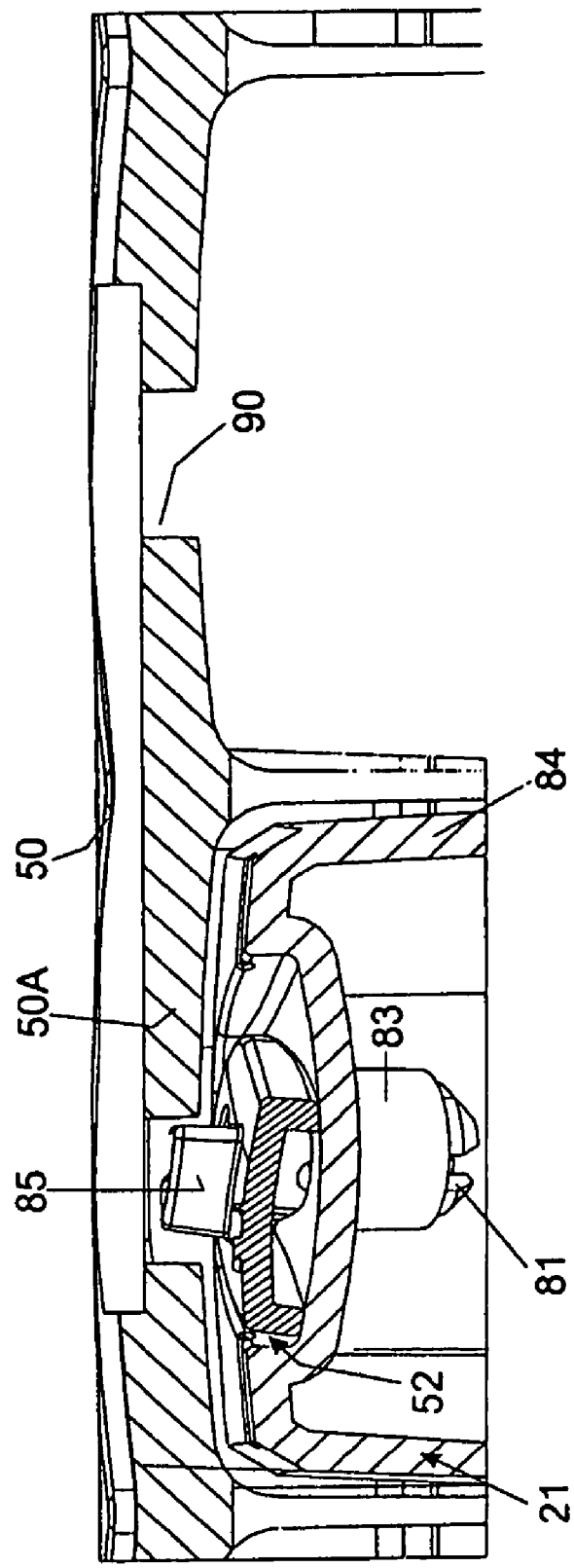

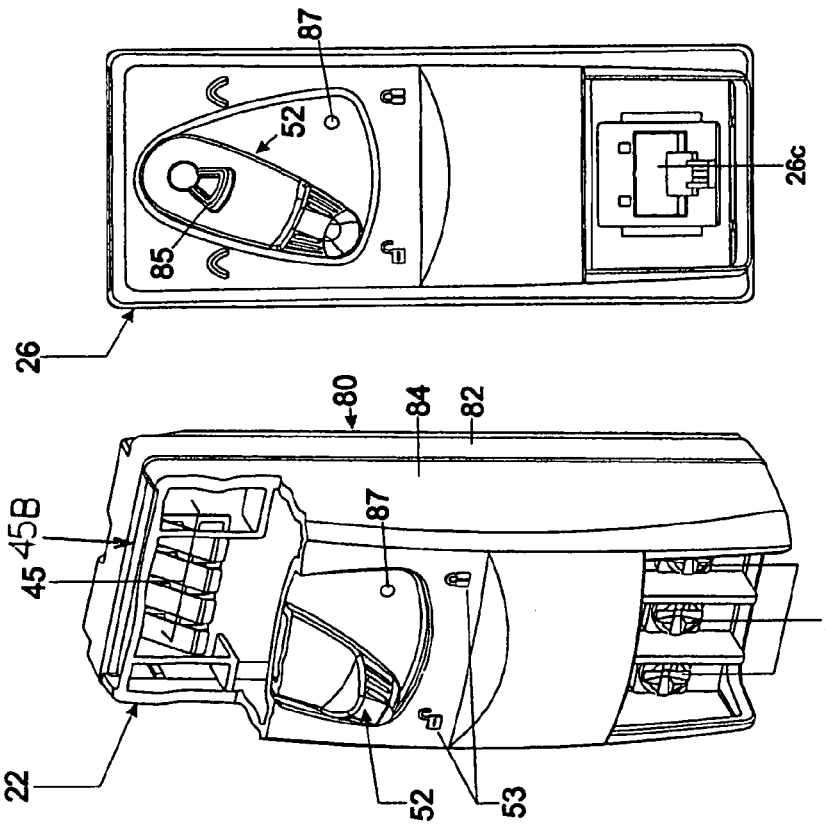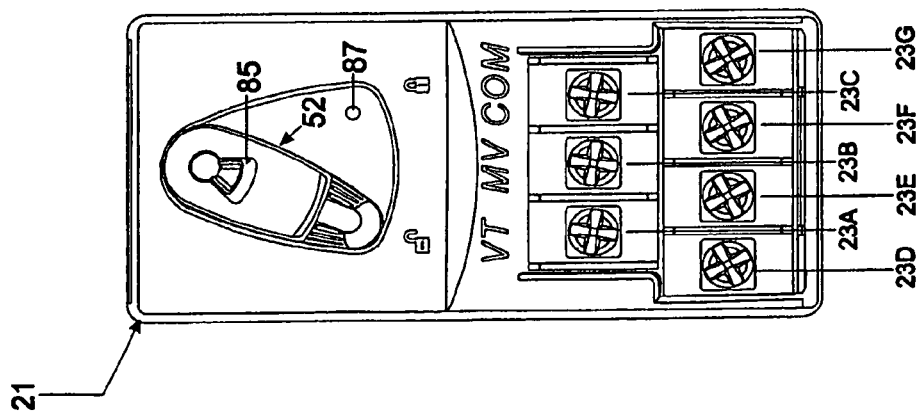

OPEN ARCHITECTURE MODULARITY FOR IRRIGATION CONTROLLERS

This application is a continuation of U.S. application Ser. No. 10/687,352, filed Oct. 15, 2003, which claims the benefit of U.S. Provisional Application No. 60/418,894, filed on Oct. 15, 2002, entitled "Open Architecture Modularity for Irrigation Controllers."

FIELD OF INVENTION

This invention relates to an irrigation controller for controlling the operation of an irrigation system. More particularly, this invention relates to a new and improved modular irrigation controller having a removable and programmable control panel, and modules that can be added to expand and increase functionality of the controller.

BACKGROUND OF THE INVENTION

Modular irrigation controllers having optional modules that can be added to the base unit to increase the number of irrigation stations operated by the controller have been in use in the field of irrigation control for some time. For example, U.S. Pat. No. 5,956,248 (William et al.) provides an irrigation controller having a housing that encloses a microprocessor that stores and executes watering programs, and includes station modules that can be added to the output bus of the base unit to increase the number of irrigation stations controlled. However, all of the logic for controlling the irrigation stations through the modules is contained inside a non-removable housing. U.S. Pat. No. 5,262,936 (Faris et al.) provides a controller wherein a base unit includes driver and switch means for actuating a predetermined minimum number of irrigation stations. Station expansion modules having drivers and output switches can be added to the base unit for increasing the number of irrigation stations controlled by the controller. Both of these patents, however, involve 'dumb' modules in the sense that the module serves only as a conduit extension of the logic inside the controller acting only as drivers (a typical diode, resistor and triac configuration) for conveying the commands from the base unit.

However, even with optional modules, a typical irrigation controller is only good for executing the watering commands for which the original architectural design of the base unit was made. To further improve capabilities/features, a user would still need to buy a different base unit controller. Additionally, control panels found on prior art base unit controllers are typically contained permanently within base unit, are non-removable, and can only be programmed on-site.

There exists, therefore, a need for an improved irrigation controller with a flexible and expandable architecture base unit having a modular design that will provide enough flexibility for further additions to an irrigation system, not only to include additional output stations, but also to upgrade to new features and capabilities.

BRIEF SUMMARY OF THE INVENTION

Embodiments of the present invention answer this need in the art by providing a novel and improved unit with flexible and expandable capabilities for controlling the operation of an irrigation system. In accordance with one embodiment, an irrigation controller comprises a housing; a control unit within the housing, the control unit including a first microcontroller for executing stored irrigation programs; and a plurality of module coupling locations, each electrically coupled with the first microcontroller and adapted to receive one of a plurality of expansion modules. The controller also comprises an expansion module removably coupled to a respective module coupling location and including a second microcontroller capable of communicating with said first microcontroller and including driver circuitry for actuating irrigation valves, the second microcontroller capable of operating the driver circuitry for actuating said irrigation valves in accordance with control signals received from the first microcontroller, wherein the expansion module may be electrically coupled and decoupled to the respective module coupling location without removing power to the control unit.

In a further embodiment, the invention may be characterized as an irrigation controller comprising a housing; a control unit within the housing, the control unit including a first microcontroller for executing stored irrigation programs; and a plurality of module coupling locations, each electrically coupled with the first microcontroller and adapted to receive one of a plurality of expansion modules. The first microcontroller is configured to detect the electrical coupling and decoupling of an expansion module to a respective module coupling location without removing power to the control unit, the expansion module including a second microcontroller capable of communicating with said first microcontroller and including driver circuitry for actuating irrigation valves, the second microcontroller capable of operating the driver circuitry for actuating said irrigation valves in accordance with control signals received from the first microcontroller.

In another embodiment, the invention may be characterized as a method for use in irrigation control comprising the steps: operating an irrigation controller having a control unit within a housing, the control unit including a first microcontroller for executing stored irrigation programs, the irrigation controller having a plurality of module coupling locations, each electrically coupled with the first microcontroller and adapted to receive one of a plurality of expansion modules; and detecting an electrical coupling and decoupling of an expansion module to a respective module coupling location without removing power to the control unit, the expansion module including a second microcontroller capable of communicating with said first microcontroller and including driver circuitry for actuating irrigation valves, the second microcontroller capable of operating the driver circuitry for actuating said irrigation valves in accordance with control signals received from the first microcontroller.

Embodiments of the invention will be better understood in the light of the following Detailed Description taken together with the accompanying drawings, which illustrate, by way of example, the principles of several embodiments.

BRIEF DESCRIPTION OF THE DRAWINGS

The accompanying drawings illustrate several embodiments of the invention. In such drawings:

FIG. 5A is a fragmentary sectional view taken substantially along the line A-A of FIG. 5;

FIG. 7 is an enlarged plan view of one embodiment of the base module;

FIG. 8 is a perspective view, partially in cut-away section, of one embodiment of the expansion module, and showing the locking lever and the terminal blocks, and having a portion of the expansion module cut away to show the finger contacts connector;

FIG. 9 is an enlarged plan view of one embodiment of the smart module;

DETAILED DESCRIPTION OF THE INVENTION

Figure 1:
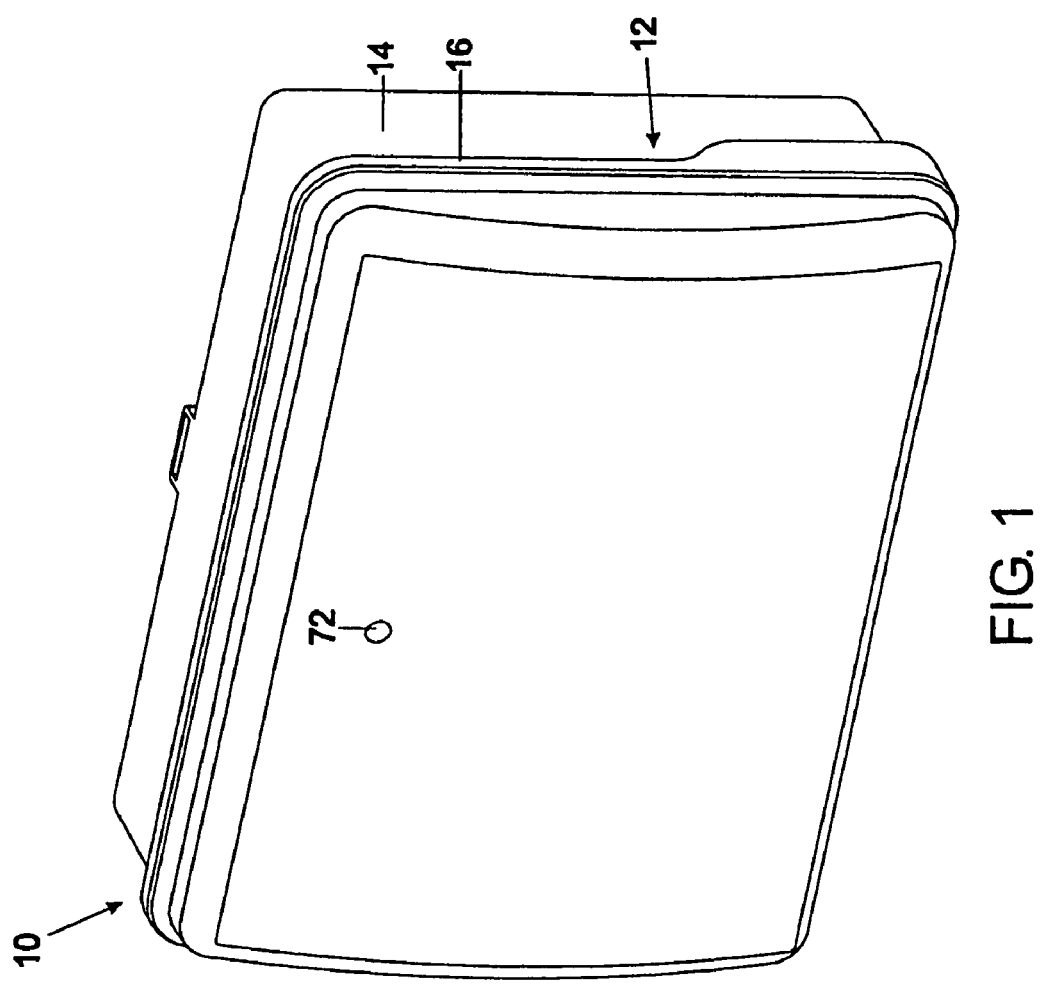
FIG. 1 is a perspective view of an enclosed housing or cabinet within which the new and improved irrigation controller according to several embodiments of the present invention is contained.

In accordance with some embodiments, an irrigation controller includes a base unit with a removable and programmable control panel and backplane circuitry for communicating with a plurality of removable modules capable of performing a variety of irrigation and non-irrigation functions. The control panel is removable from the base unit to permit the controller to be programmed at a remote location by the user. A base module having irrigation station drivers is mated with the backplane circuitry and communicates with the base unit to carry out basic irrigation functions. A plurality of expansion modules and one or more smart modules, each having its own logic circuit, can be mated with the backplane circuitry to communicate with the base unit. In some embodiments, the base unit, per se, does not have sufficient functionality to carry out any of the required irrigation functions, but rather requires the addition of the base module to carry out the watering schedule.

The addition of expansion modules can be used to expand the number of output stations and increase functionality. Expansion modules receive commands from the control panel to activate or deactivate irrigation station outputs. These expansion modules contain an internal processor so that they may make autonomous decisions. The control panel is normally refreshing the expansion modules on a repetitive basis with commands to indicate which irrigation stations should be active or inactive at the present time. If a failure was occur to any circuitry outside of the expansion module, the expansion module might potentially leave an irrigation station on indefinitely, causing a massive waste of water and most likely landscape damage. The expansion modules, through their internal microprocessor, detect the lack of refresh data from the control panel, interpret this as a failure mode and deactivate all irrigation stations attached to this module.

Additionally, in some embodiments, smart modules can be added to the base unit to extend the functionality of the overall controller. These smart modules are capable of processing data independently of the control panel and making independent control decisions. In addition, smart modules are capable of communicating with the control panel, passing information back and forth, and making a joint decision on how to control an irrigation station. Smart modules are empowered by the use of a local microprocessor inside the module, bi-directional communication with the control panel, and the ability to share data between the control panel and the smart module through this bi-directional communication.

The processor inside the smart module contains a plurality of specific irrigation control algorithms that may not be available in the control panel. By installing a smart module in the base unit, the control panel and smart module can intercommunicate to achieve a plurality of irrigation control functions not available in either the base unit or the smart module independently.

Irrigation controllers typically store several programs that are used to describe the irrigation functions to be performed on a repetitive basis. Typically these programs are repeated every day, every week, or every two weeks. In one embodiment, the invention further contains a duplicate set of programs that can be stored in the controller's non-volatile memory. In one implementation, a method recalls this duplicate set of programs thus replacing the current programs. This allows the user to effectively store two complete sets of programs, whereby the secondary one can be recalled by the user at which time it becomes the active set of programs.

Figure 2:
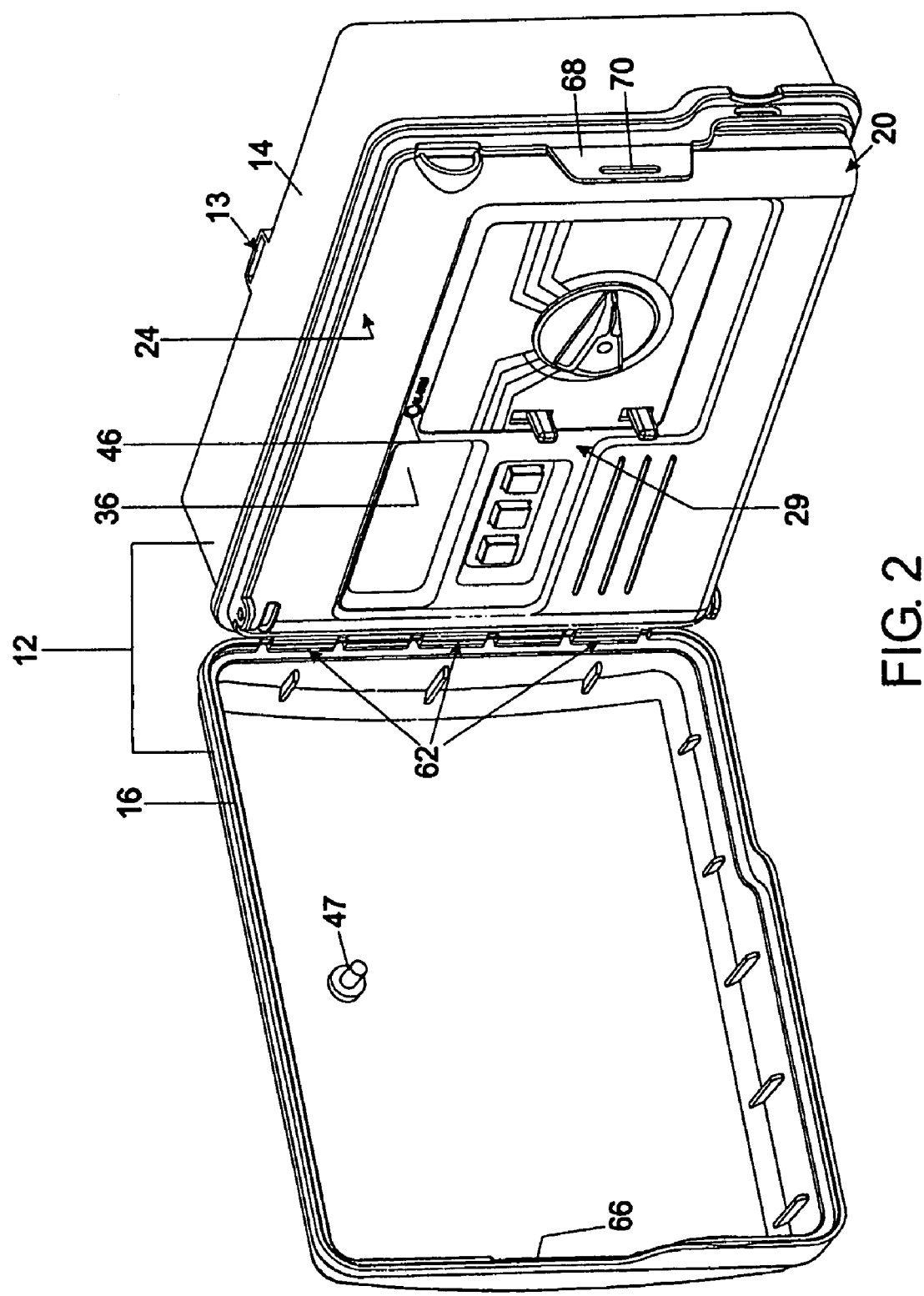
FIG. 2 is a perspective view of the irrigation controller housing of FIG. 1, showing the housing door in an open position to reveal the control panel of the controller base unit.
Figure 3:
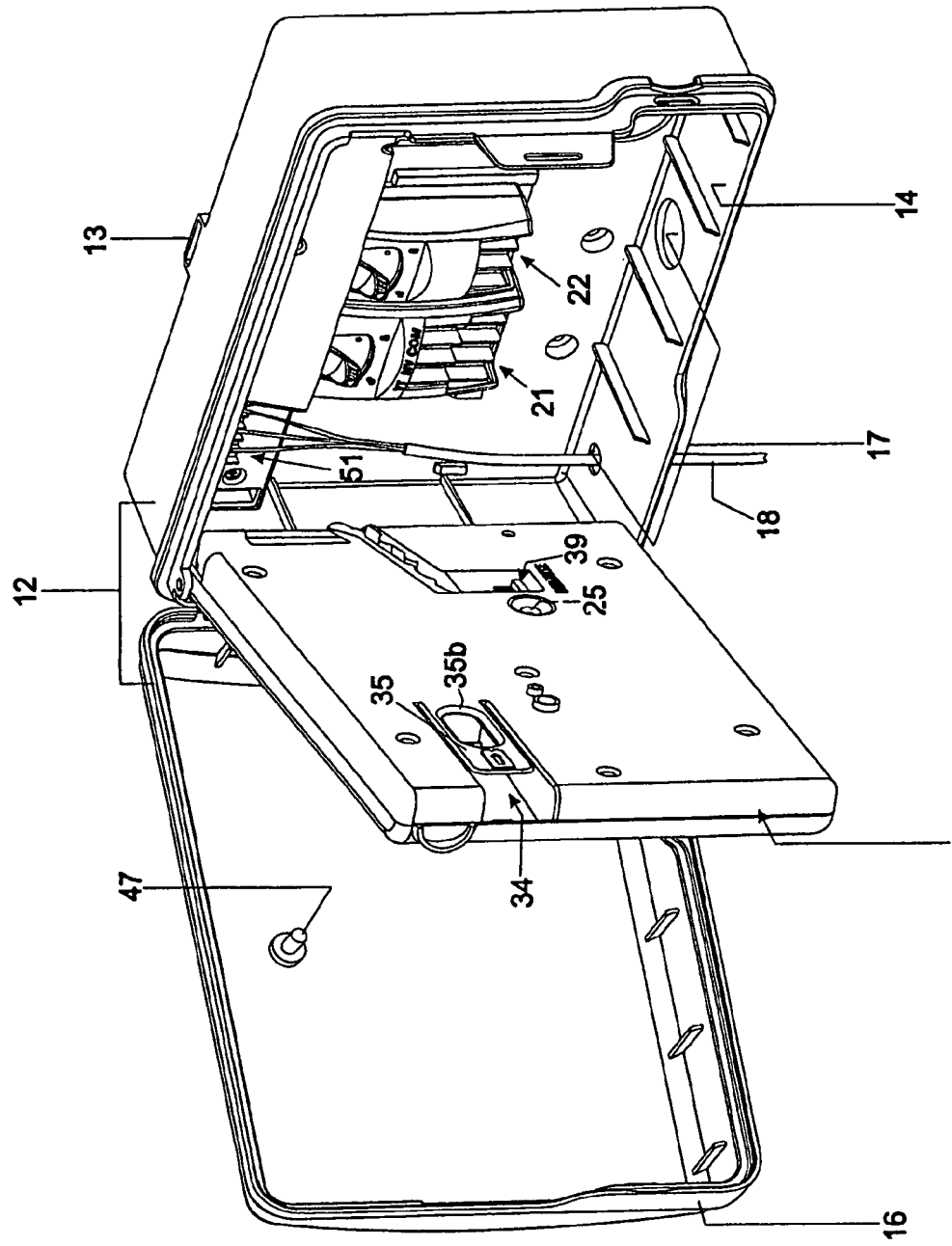
FIG. 3 is a perspective view of the irrigation controller housing of FIG. 1 showing the base unit control panel in an open position and showing a base module and an expansion module mounted within the housing.

One embodiment of the invention, generally designated at 10, is illustrated in FIG. 1. As shown, the expandable architecture modular irrigation controller 10 is installed in a water-resistant controller housing or cabinet 12 having a generally box-shaped appearance with a front cover door 16 and a rear main cabinet portion 14, the front cover door being attached to the rear cabinet portion by a hinge 62 that permits the front cover door to be opened for access to the inside of the rear cabinet, as best seen in FIG. 2. When the unit is installed on site, typically on a wall or the like through a key hole mount 13, power wires 18 and valve control wires (not shown here) run though wiring access holes 17 in the bottom of the controller housing 12, as seen in FIG. 3. The new and improved irrigation controller 10 having an expandable architecture modular design allows for easy and economical expansion of the controller capabilities not found in other controllers.

The controller housing 12, preferably formed of plastic or other suitable material, is designed to withstand various environmental conditions, and houses a base unit 24, a base module 21, expansion modules 22 and smart modules 26. To releasably retain the cabinet door 16 in the closed position, the door edge opposite the hinge 62 includes a laterally inwardly projecting lip 66 that releasably mates with an opening 70 formed in a tab 68 projecting forwardly from the front edge of the rear cabinet portion 14. Upon release of the lip 66 from the opening 70, the cabinet door 16 pivotally swings open about the hinge 62 to reveal a removable and programmable control panel 20 that includes a user interface to enter and maintain an irrigation schedule. The cabinet door 16 contains a window 72 to which is mounted a light pipe 47. The light pipe 47 is positioned on the cabinet door 16 to provide direct viewing of a light emitting diode (led) alarm indicator 46 when the cabinet door 16 is closed.

The base unit 24 carries out basic irrigation functions and also performs other advanced functions, and comprises the control panel 20 that is removably attached to the front of the rear cabinet portion 14, and a back plane circuit board 51 (see FIGS. 3 and 5) permanently housed in the rear cabinet portion and having circuitry for connection to the base module 21, expansion modules 22 and smart modules 26. The control panel 20 is pivotally coupled to the rear cabinet 14 and swings open to provide access to the interior within which various electronic components, including the backplane circuit board 51 are located. Terminal blocks on the back plane circuit board 51, designated 31a-31e in FIG. 6, provide an interface to the power supply line 18, an earth ground line and various sensor input lines (not shown here).

It is an object of several embodiments to have an easy and intuitive user interface to enter and modify a plurality of irrigation schedules for an irrigation system. As seen in FIG. 2, the front surface of the control panel 20 includes various operational controls and indicators 29 that assist a user in interfacing with and programming the controller and the irrigation system. In this instance, a liquid crystal display (LCD) 36 provides a visual output of information to the user such as when operating the programming functions, among other tasks. An LED Alarm Indicator 46 seen in FIG. 2 illuminates when a faulty condition is detected, for example, at a station output in a standard expansion module 22, or a programming error in the control panel microcontroller 20c. Illumination of the LCD is visible through the window 72 in the cabinet door 16 when it is closed.

Figure 11:
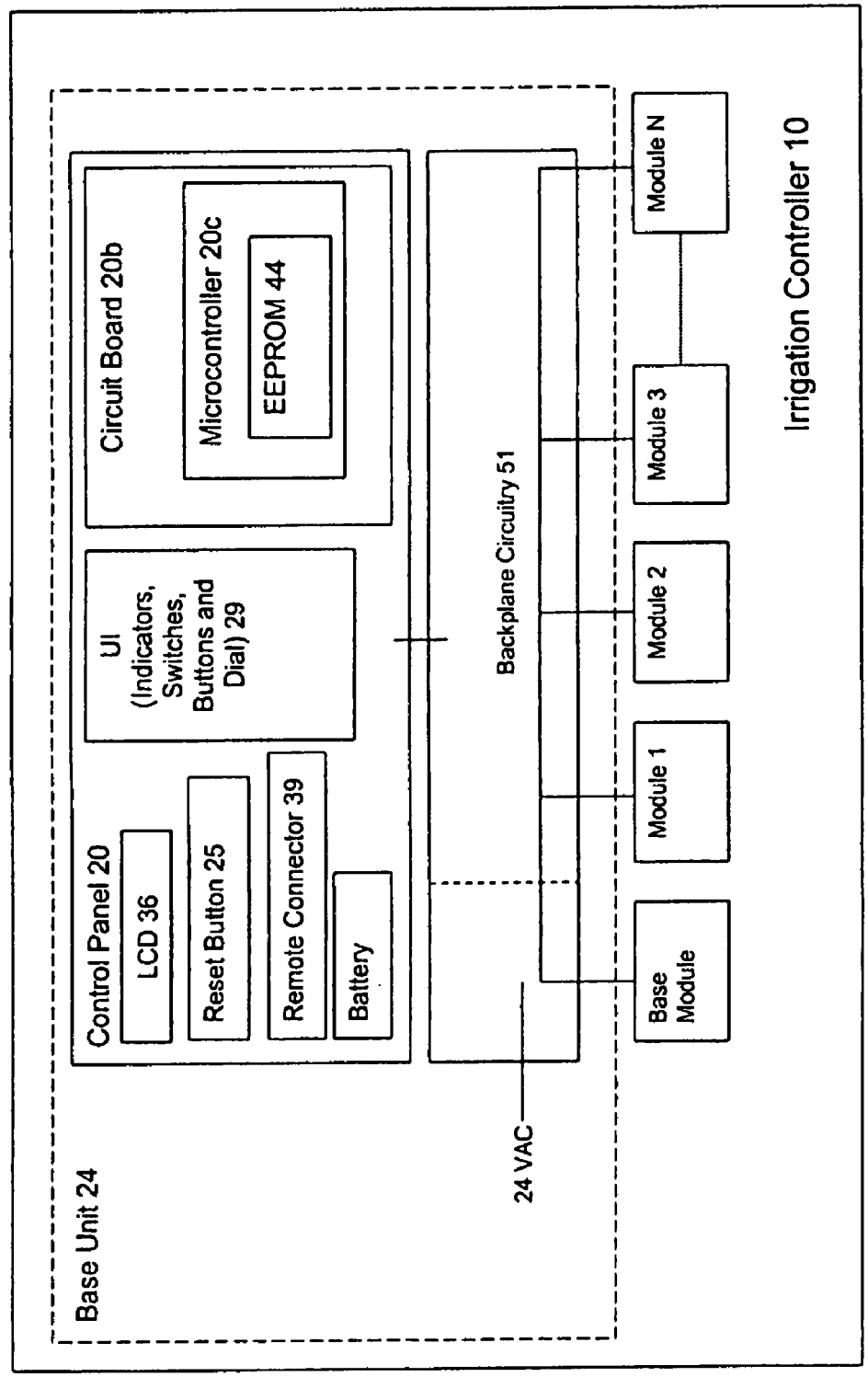
FIG. 11 is a block diagram of several embodiments of the irrigation controller.
Figure 18:
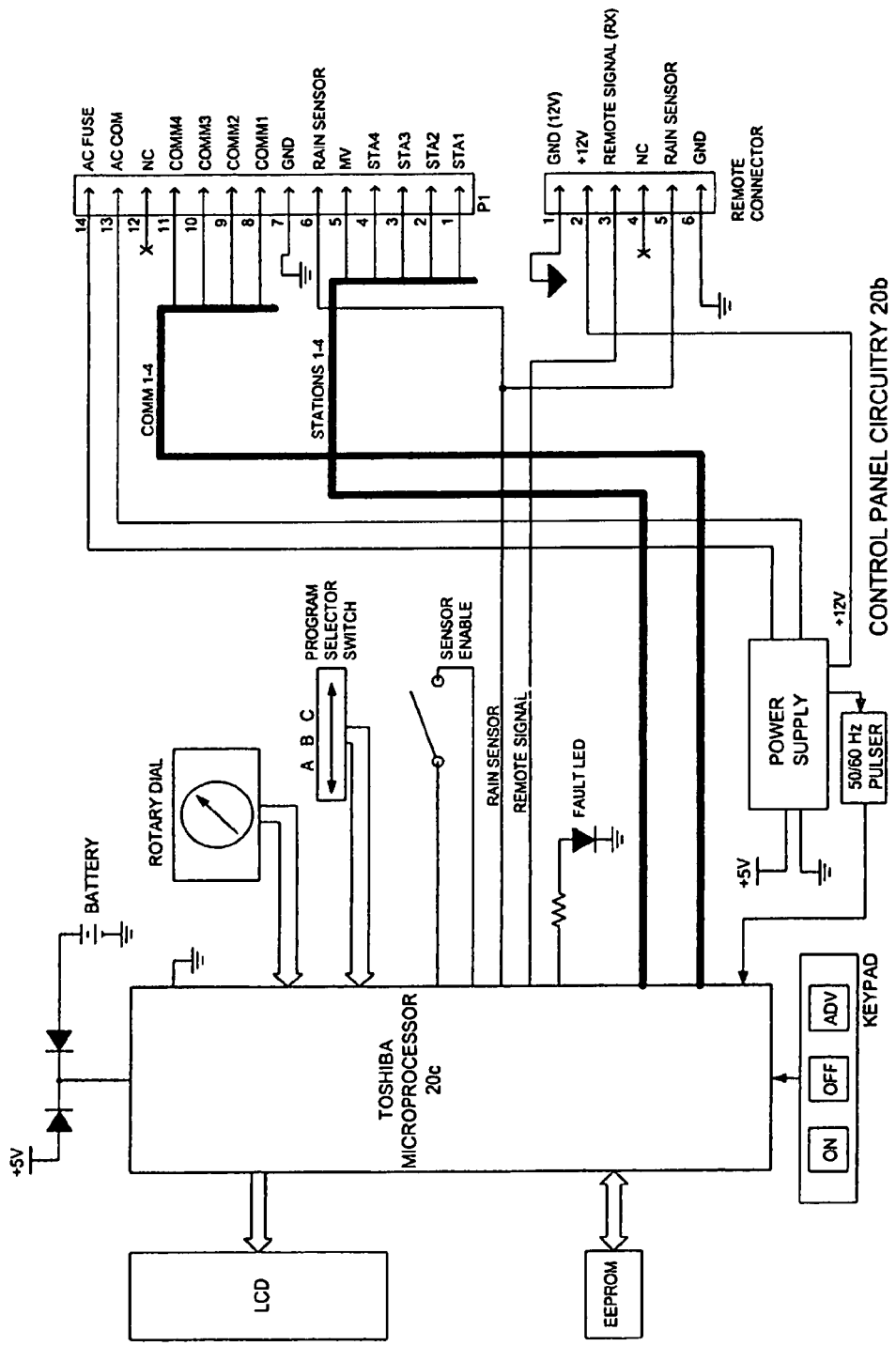
FIG. 18 is a schematic diagram of the control panel circuit.

With reference to FIGS. 11 and 18, the control panel 20 has circuitry 20b (shown in FIG. 18) that includes a control panel microcontroller 20c that communicates with the backplane circuitry 51 to activate the irrigation functions as defined in an irrigation program as well as other functions as may be contained in the smart modules 26. The microcontroller 20c sends commands via the back plane circuitry 51 to the base module 21 and/or the expansion modules 22 to activate irrigation valves according to a pre-programmed schedule or via a manually initiated irrigation cycle. In the presently preferred embodiment, the microcontroller 20c of the control panel circuitry 20b employs a TMP87CM20F microcontroller manufactured by Toshiba, and is powered by a 5 VDC power supply. A non-volatile memory backup (EEPROM) 44 maintains the watering schedule upon line power outages.

Figure 17:
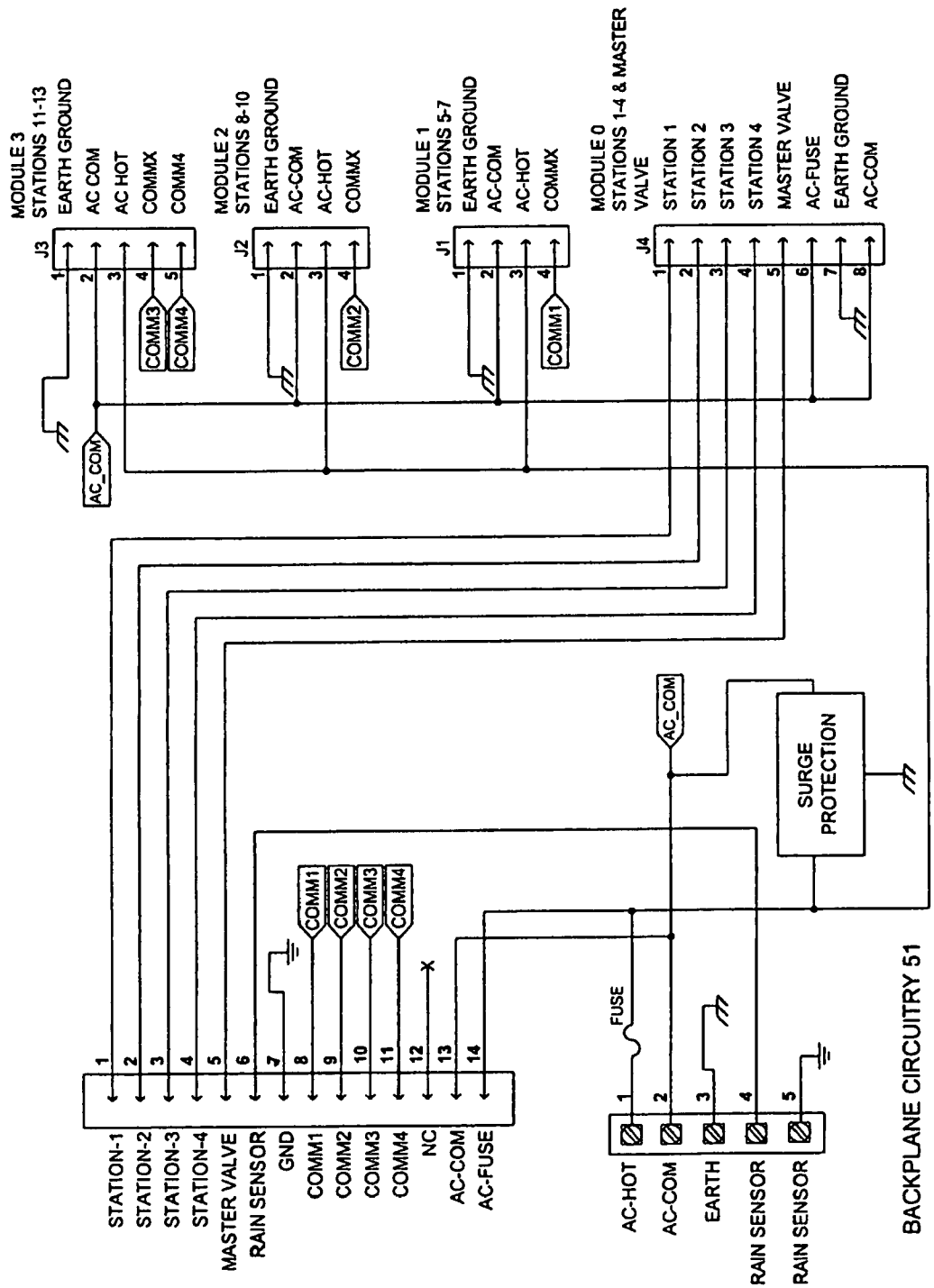
FIG. 17 is a schematic diagram of the backplane circuit board circuit.

As best seen in FIG. 17, the back plane circuitry 51 herein includes 13 active input stations (station 12 is not active) that communicate with the microcontroller 20c of the control panel 20. In this instance, the stations include four station inputs for actuating valves, a master valve station, a rain sensor station, a ground line station, four communications stations, an AC-com station, and an AC-fuse station. The information conveyed from the control panel 20 to the back plane circuitry 51 is then distributed to individual output bays 19 (see FIG. 5) into which one or more irrigation function control modules 21, 22, and 26 have been inserted. As shown in FIG. 17, the base plane circuitry 51 includes an output connection, "module 0", that communicates information to the base module 21; two output connections, "module 1" and "module 2", for bays 19 that can receive expansion modules 22; and an output connection for a smart module 26, "module 3." As will become more apparent hereinafter, not only can an expansion module 22 be used in place of a smart module 26 in the station designated "module 3," but expansion modules can be used in any of the bays 19, with the sole exception of "module 0" which is reserved for the base module 21.

Figure 4:
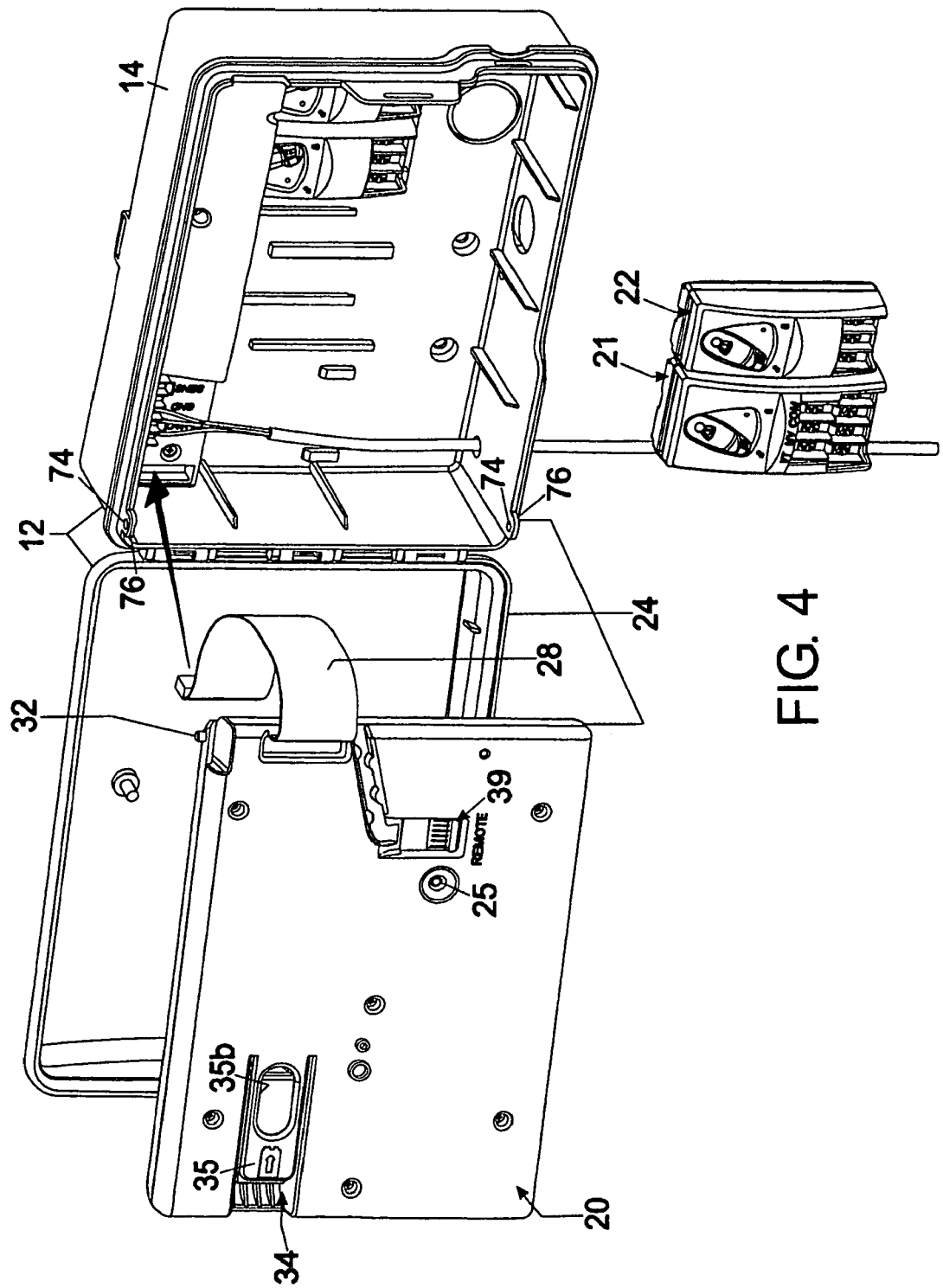
FIG. 4 is an expanded perspective view somewhat similar to FIG. 3, but showing the base module and the expansion module removed from the housing and having one additional expansion module and a smart module installed therein, and showing the control panel detached from the housing.

The control panel 20 can be removed from the controller 10, as seen in FIG. 4, for remote stand-alone programming by the user. In this connection, the control panel 20 is pivotally attached to the front edge of the rear housing portion 14 through a pair of hinge pins 32 that are releasably received in holes 74 formed in tabs 76 projecting forwardly from the rear housing portion. The tabs 76 are sufficiently flexible to permit the pins to be released for removal of the control panel 20, but are sufficiently rigid to retain and support the control panel on the rear housing.

A detachable ribbon cable 28 removably connects the control panel 20 to the backplane circuitry 51 so as to permit the control panel 20 to be completely removed from the base unit 24. To provide power so that the control panel 20 can be removed and programmed independent of an outside power source, a battery (not shown) is provided in a recess 34 in the control panel 20. This further provides additional flexibility in that, for example, a damaged control panel can quickly be changed and replaced with a new control panel without the need to replace the entire base unit 24. This feature also lets the user enter program information before installing the controller at a job site. In this instance, the battery is retained by a cantilever-type spring biasing element 35 that frictionally presses against the side of the battery to hold it in position. The battery is easily removed via a finger access hole 35b located in the spring biasing element 35 which allows the user to simply insert a finger, pull up on the spring element slightly to release the frictional contact, and remove the battery from the recess 34 shown in FIG. 4. The spring biasing element 35 allows the battery to be retained and/or replaced without the use of any tools, such as screws, and retains the battery without additional parts, such as a latch or a swinging door. This results in less cost for manufacturing due to lack of additional parts (screws, doors, etc.). This also results in an easy, single-handed removal and insertion of the battery.

Figure 5:
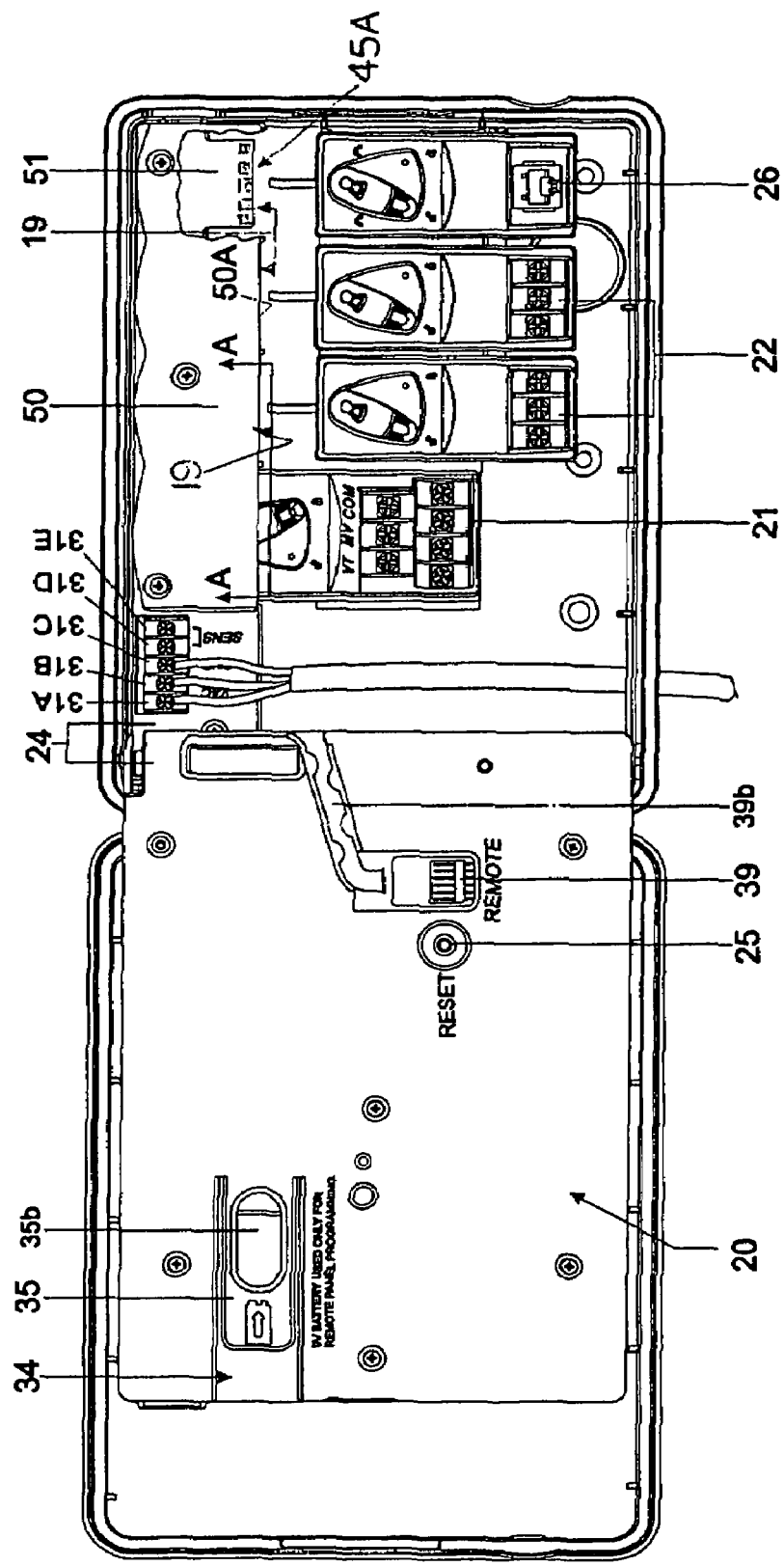
FIG. 5 is a front plan view of the controller housing with the door open and the with the base module locked in and two expansion modules and the Smart module placed on the insertion rail guides and with a portion of the backplane cover cut away to show the bay and the backplane circuitry underneath the backplane cover.
Figure 6:
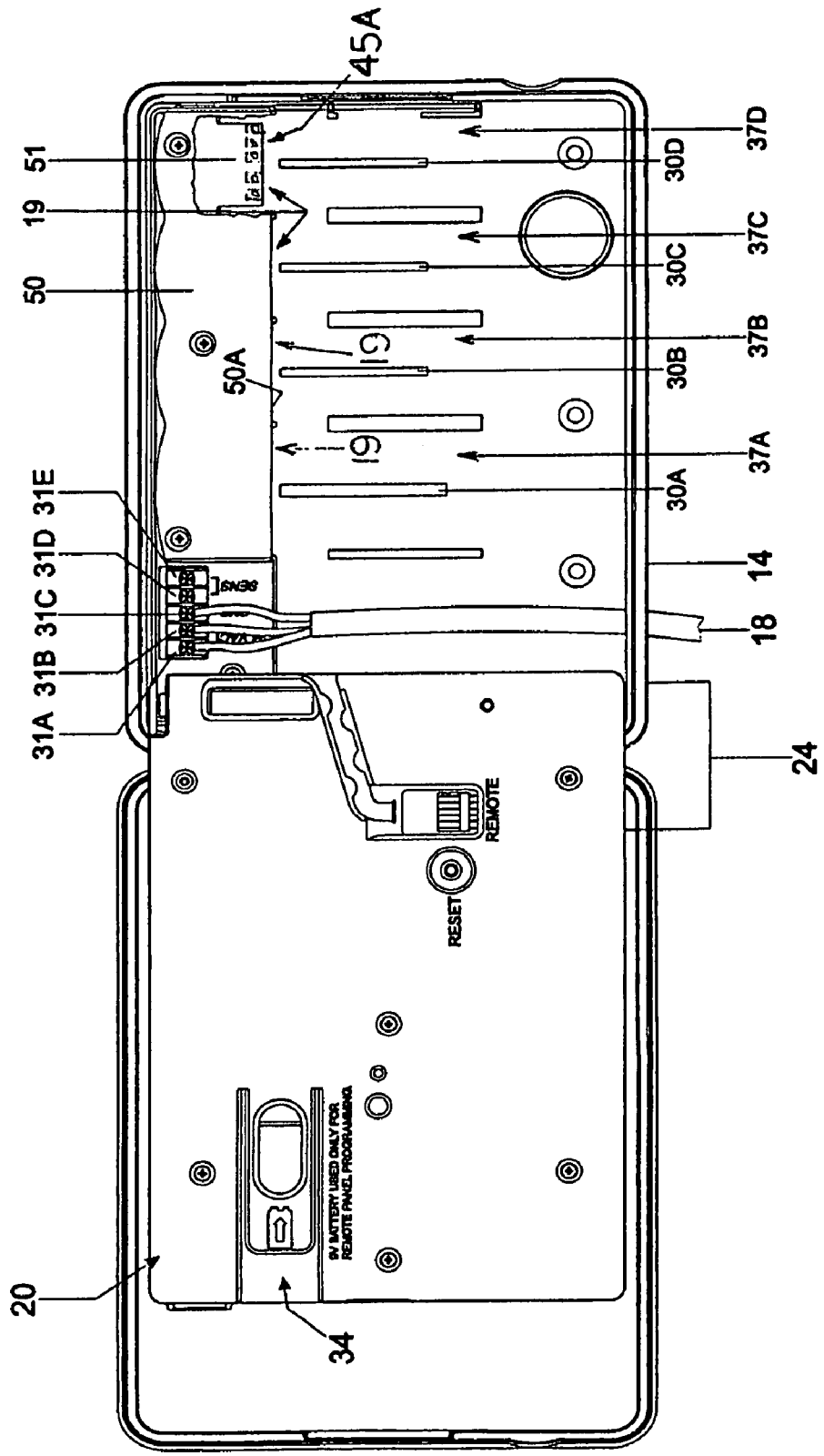
FIG. 6 is a front view of the open controller with the control panel opened to 180 degrees showing its back and revealing the interior of the base unit with all modules removed and with a portion of the backplane cover cut away to show the backplane circuit board underneath the backplane cover.

A reset button 25 is located at the back of the control panel 20 as seen in FIG. 5. The reset button 25 serves to restart the control panel microcontroller 20c from a potential lock-up condition possibly caused by electrical disturbances. A "remote" connector 39, also indicated in FIG. 5, provides the means to connect a wireless receiver to the irrigation controller 10, and a wire retention channel 39b is provided to direct and restrain the remote connection cables (not shown). An authorized person equipped with the wireless control has now the means to manually activate irrigation valves, modify the irrigation schedule or the behavior of any additional tasks the irrigation controller is capable of performing.

In several embodiments, the base unit 24 relies on the insertion of the base module 21 to be capable of activating any irrigation stations. The base unit 24 does not have sufficient capability by itself to control an irrigation station, as there are no driver or output switches for irrigation stations within the base unit 24. Instead, drivers and switching means are located in the base module 21 and the expansion modules 22. It is an object of some embodiments to achieve flexibility and cost savings. For example, a damaged component such as a microcontroller or station switch in a prior art base unit would require that the entire base unit be replaced. In one embodiment, a damaged component in the base module 21, the expansion module 22 or the smart module 26 requires only that the damaged module be swapped out and replaced on-site by a new module in much less time than is needed to install a new base unit and at significant cost savings. The expandable architecture allows the user to choose from a variety of expansion modules 22 that can include standard irrigation modules for carrying out watering schedules or smart modules 26 for carrying out additional functions.

Figure 10:
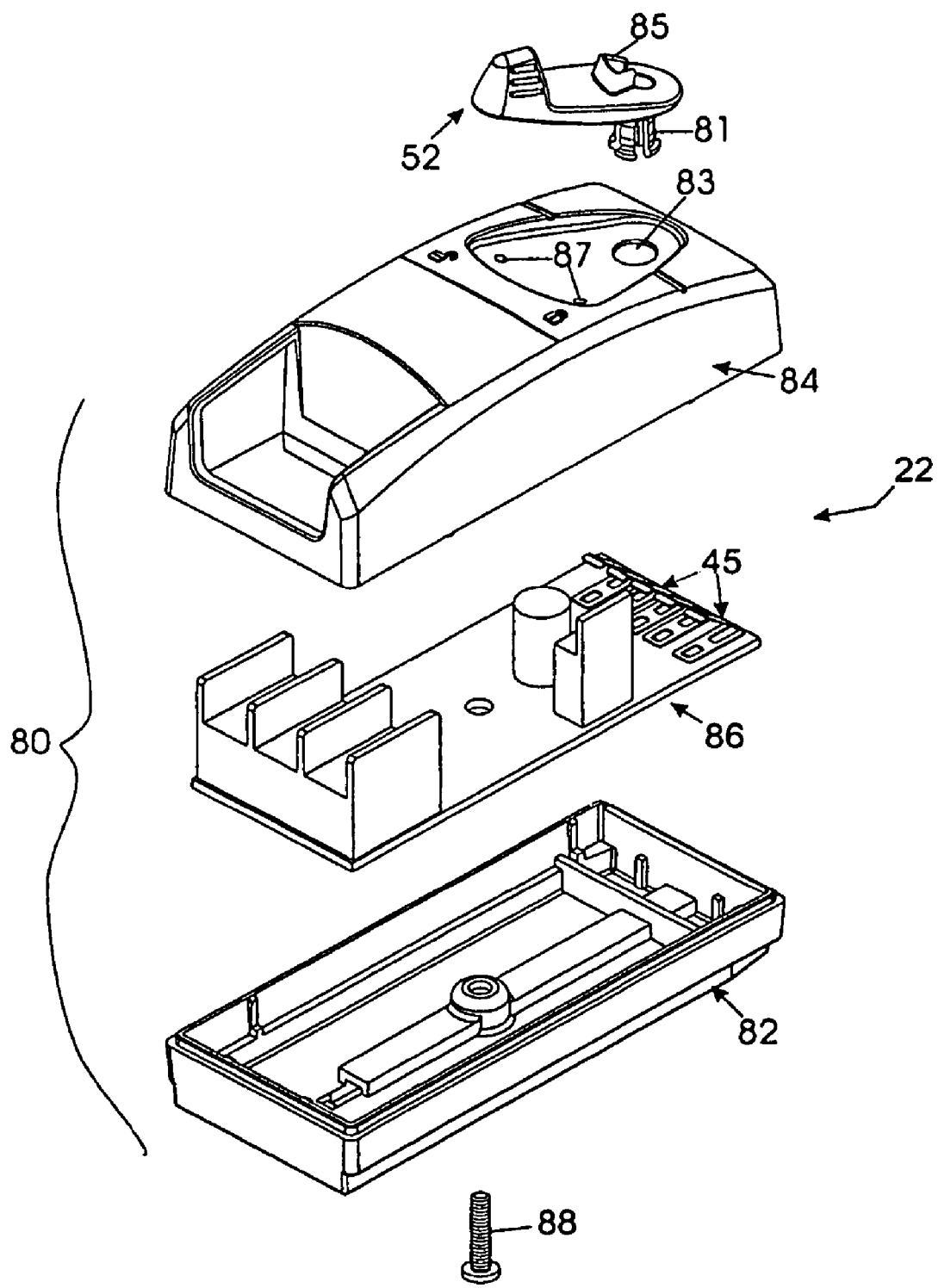
FIG. 10 is an exploded perspective view of a module, herein an expansion module, showing the module basic component parts.

Moreover, as shown in FIGS. 7-10, each module 21, 22, and 26 is relatively simple in construction and incorporates similar basic components. As seen in FIG. 10 which depicts the structure of an expansion module 22, but which is also representative of the structures of each of the base and smart modules 21 and 26, the module includes a housing 80 comprising a lower portion 82 and an upper portion 84 which mate together to encase and protect the module circuit board 86, and herein are held together by a screw 88. Rotatably attached to the top of the upper module housing 84 is a rotary locking lever 52 that function to securely hold and retain the module in position when installed into the controller 10. The locking lever 52 has a downwardly projecting pin 81 that is snap fit through a cylindrical sleeve 83 formed in the upper module housing 84 to pivotally attach the locking lever to the upper module housing, and includes an upwardly projecting locking tab 85 that functions to lock the module in its operative position. As best seen from the expansion modules 22 and the smart module 26 in FIG. 5, when the locking lever 52 is in one rotary position, herein the left rotary position, the locking lever is "unlocked" while when the lever is in the counterclockwise rotary position to the right such as shown for the base module 21, the lever is in the "locked" position as shown in FIG. 5A in detail. To frictionally retain the locking lever 52 in the "locked" and "unlocked" rotary positions, the underside of the locking lever has a small downwardly projecting nipple (not shown) that snap fits into corresponding recesses or dimples 87 in the upper module housing 84.

As shown in FIG. 6, module insertion paths 37A-37D lead to individual bays 19 that accommodate docking and electrically coupling of the expansion modules 22 and smart module 26 with the back plane circuit board 51. In this instance, path 37A is reserved for the base module 21 and paths 37B and 37C are for expansion modules 22 and path 37D is for either another expansion module, or the smart module 26. Each of the modules, 21, 22, and 26 electrically couples and interconnects with the backplane circuitry 51 via sets of conventional spring finger contacts 45 indicated in FIGS. 8 and 10 that electrically couple with complementary sets of conventional electrical contact pins 45A of the backplane circuitry 51 (see FIG. 5). Each module also includes output terminals 23, 27, and 26, herein in the form of conductive screws, to which output wires to irrigation components such as valves and solenoids can be attached in a conventional manner.

In this connection, the electrical contact pins 45A of the back plane circuitry 51 are grouped in sets corresponding to the location of each bay 19 into which a module can be positioned. Herein, as seen in FIGS. 5 and 6, the electrical contact pin sets 45A for each bay 19 are carried on generally rectangular shaped tongues 51A formed as part of the back plain circuit board 51, and slide into complementary slots 45B (see FIG. 5A) in the front end of the housing 80 to make electrical contact with the corresponding set of spring finger contacts 45. It should be apparent that additional modules could be accommodated by the addition of an expanded base unit 24 and its back plane 51 and number of bays 19. To secure and retain the Base module 21, the expansion module(s) 22 and the smart module(s) 26 to the base unit 24, and to releasably retain the modules in position, the module insertion paths 37A-37D are partially covered by the backplane cover 50 as seen in FIG. 6, such that the modules can be slid into the module insertion paths 37A-37D and into the bays 19 to be coupled to the backplane circuit board 51, as best shown in FIG. 5.

To properly position and guide the modules 21, 22, and 26 into the bays 19, each module includes longitudinal recesses (not shown) formed along the bottom of the lower module housing 82 that can mate with upstanding guide rails 30 formed on the bottom wall of the rear cabinet portion as seen in FIG. 6. Once the module is inserted into the bay 19, the user indexes the locking lever 52 from the unlocked to the locked position. In this instance, as best seen in FIG. 5A, the backplane cover 50 has a downwardly projecting wall 50A extending along the length of the forward edge, and which has openings 90 corresponding to the locations of the insertion paths 37A-37D, and through which the locking tabs 85 of the modules can move when the module locking lever 52 is in the "unlocked" position. When a module is fully inserted into one of the insertion paths 37A-37D, the locking lever 52 is then rotated counterclockwise which causes the locking tab 85 to move out of alignment with the opening 90 and into abutting engagement with the rear side of the wall 50A adjacent the opening. With the tab 85 abutting the wall 50A, the module is securely locked in position, and cannot be pulled out of the controller unless the locking lever 52 is first rotated to align the locking tab with the opening 90.

Figure 12:
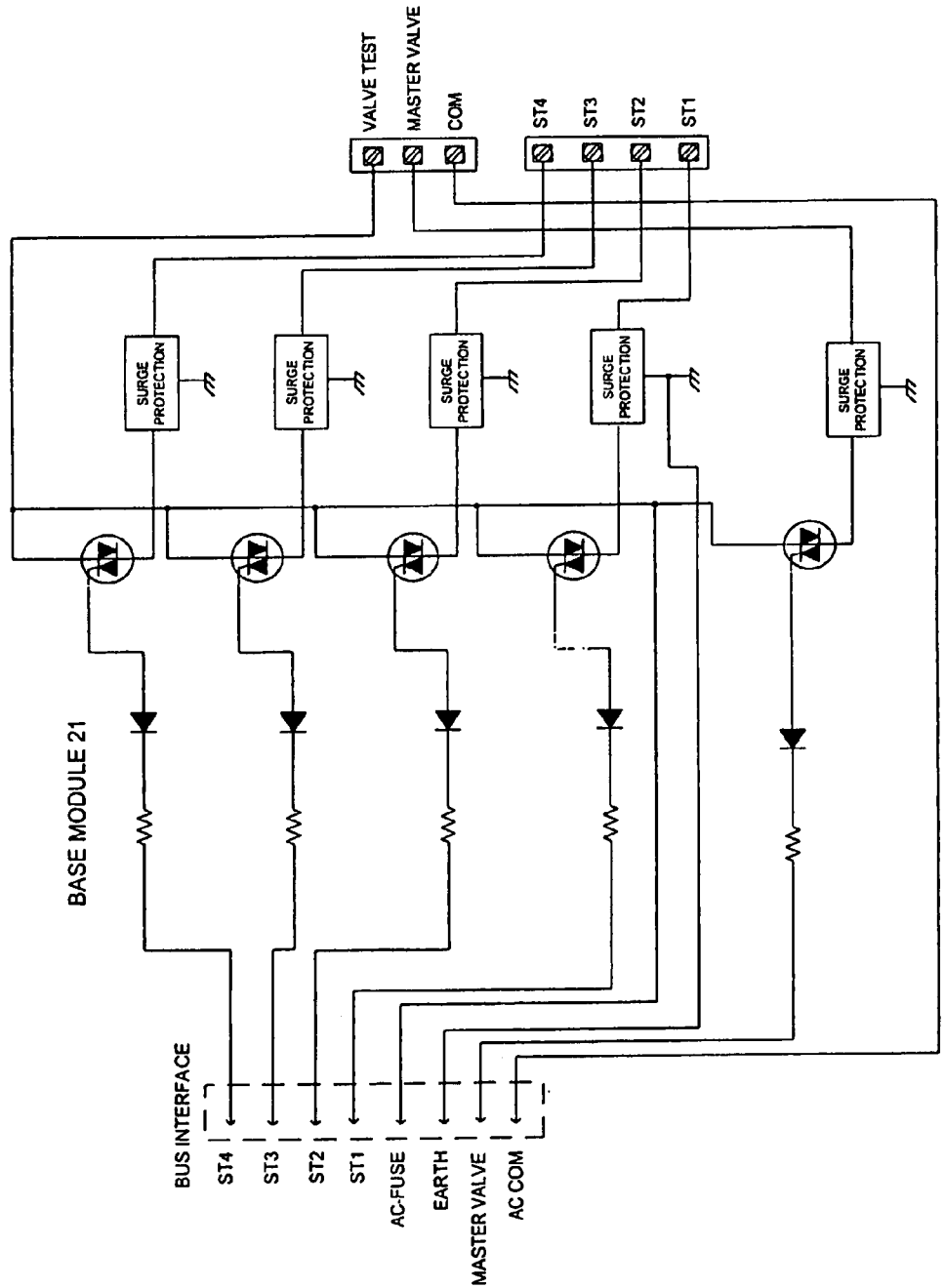
FIG. 12 is a schematic diagram of one embodiment of the base module circuit.

The base module 21 is responsible for the carrying out basic irrigation functions, such as turning on or off irrigation system valves (not shown here) which control the flow of water to the irrigation stations for the preset programmed duration. The presently preferred circuitry for the base module 21 is illustrated in FIG. 12. As can be seen, the base module circuit 21 includes a bus interface having input connections from the back plane circuit board 51 for controlling a master valve and four individual station valves, and incorporates surge protection circuitry for lightning protection. Valve test circuitry is also provided to allow the user to assess the condition of the system. As best seen in FIG. 7, the base module 21 includes a number of conductive screws that serve as output terminals 23 for connecting the module to irrigation station valves. Herein, the base module 21 includes a plurality of station output terminals 23D-23G (preferably four station output terminals), a 'hot post' terminal 23A (VT) to test the valves during installation, a terminal 23B for a master valve (MV) and a terminal 23C for a common wire terminal (COM).

The expansion modules 22, which are generally identical to each other, enable a user to quickly and easily expand the capabilities of the controller 10 functions without requiring the purchase of a new base unit 24. Each of the expansion modules 22 includes three station output terminals 27, herein in the form of conductive screws, as seen in FIG. 8, to which output wires to irrigation components such as valves and solenoids can be attached.

Each expansion module 22 includes a microcontroller 22b (see FIG. 13) capable of communicating with the microcontroller 20c of the base unit 24. By using a micro-controller in the expansion module 22, the number of connections required is reduced, as well as space and cost. As illustrated in the circuit diagram of FIG. 13, the microcontroller 22b is capable of communicating with the control panel microcontroller 20c and controls the drivers and switches for the output stations. In the presently preferred embodiment, the microcontroller 22 b employed in the expansion module is an Atmel AT-TINY12L-4 microcontroller that provides communication to the base unit 24, thereby substantially reducing the number of connections between the module and the base unit 24 while at the same time handling the 'drivers' to the output stations. The basic Irrigation controller 10 of the present invention has no irrigation stations, but separate modules can be added later for a determined location, and to provide possible upgrade for a future improvement to the initial installation.

The microcontroller 22b in the expansion module 22 and the microcontroller 20c in the base unit 24 are mutually dependent upon each other in order to operate. The communication between the control panel microcontroller 20c and the expansion modules 22 takes place through an asynchronous serial communication line, namely, COMMX. During the communication, data bits are transmitted in 100 µs intervals. In order to obtain a consistent time reference for data reception, bit marks are set at 100 µsec. Due to the fact that the control panel microcontroller 20c and the modules 21 and 22 are running asynchronously, each running on a separate clock, a bit jitter of 8.4 microseconds, worst-case, could be realized. To guarantee the bit jitter not exceeding 8.4 microseconds, it is necessary that the control panel microcontroller 20c disables any interrupts associated with any other interrupt functions, such as key actuation by a user, and only service the communication task at hand. Other functions and operations should not be affected adversely since the communication sequence lasts only for approximately half a millisecond per module.

Preferably, the communication protocol consists of a negative start bit, 3 data bits, and an active low acknowledge. The recognition of the start bit by the module prompts the module to read the station status bits near the center of each 100 us bit mark. Upon completion of the status bits by the control panel microcontroller 20c, the control panel microcontroller releases the serial communication line and allows the module to acknowledge data reception by pulling down the serial communication line.

The microcontroller 22b in the expansion module 22 looks at the received data which contains information about which irrigation stations attached to this module should be activated or deactivated. The microcontroller 22b must receive three consecutive messages with identical information before it actually makes a change to the irrigation station outputs. This provides a robust communication implementation whereby the irrigation stations do not erratically turn on or off under noisy data conditions.

The control panel microcontroller 20c sends irrigation station data to every expansion module 22 through the backplane circuitry 51 on a one second interval, thereby insuring that each microcontroller 22b in each expansion module 22 is refreshed with irrigation station data every one second. The microcontroller 22b in the expansion module 22 also includes a timeout mechanism. A timer inside the microcontroller 22b and an interrupt service routine in the microcontroller firmware is used to create a repetitive internal clock tick every few hundred microseconds, which in turn, increments a counter to keep track of seconds. This clock tick and counter is used to measure the interval time gap since the last valid communication packet received by the module microcontroller 22b from the control panel microcontroller 20c. If this time interval gap exceeds five seconds, the microcontroller 22b in the expansion module decides that a fatal communication failure has occurred and the microcontroller 22b deactivates all irrigation station outputs connected to itself.

Each time that the control panel microcontroller 20c sends irrigation station data to an expansion module 22, the microcontroller 22b in the expansion module 22 will respond with an acknowledge bit. This acknowledge bit is transmitted by the microcontroller 22b immediately after the receipt of the station status bits in the serial communication. If the control panel microcontroller 20c does not receive an acknowledge bit, this is an indication that a module is not installed in that specific path 37A-37D of the bay 19. After communicating with each connector in the bay 19, the control panel microcontroller 20c will know which paths have modules installed and which do not. The firmware of the control panel microcontroller 20c will correlate this information to determine which irrigation stations are effectively available to the irrigation program. If a user attempts to program an irrigation station that is not present, the firmware will alert the user by displaying a message such as "No Module".

The spring finger contacts 45 of the expansion modules 22 mate with complementary contact pin sets 45a formed in the backplane circuitry 51, for example as is shown in FIG. 8. In several embodiments, the backplane contact pins 45a carry power and data signals, and are arranged as sets in a manner whereby the power signals establish a circuit connection prior to the data lines when the module is inserted into the bay. In this manner, the module's microcontroller power will have stabilized before any voltage appears on the data lines. Stabilizing the power of the module's microcontroller before voltage is applied to the data lines prevents the microcontroller in the module from latching up or overloading its current ratings on its input/output pins. This allows the module to be removed from and inserted into the bay 19 without the need to first remove power from the remainder of the controller 10. Embodiments of this invention are novel in the industry as other modular irrigation controllers using microprocessors in their modules must first have their power removed before any modules can be removed or inserted. In addition, the firmware in the control panel microcontroller 20c is able to handle the dynamic appearance and disappearance of irrigation stations without the need to restart or reboot the firmware. This is made possible by having the firmware continuously verify if a module that corresponds to each irrigation station is installed. For stations that are detected as being not available, the firmware prohibits the user from enabling that station. In addition, it alerts the user that the station is unavailable by displaying a message such as "No Module".

Figure 13:
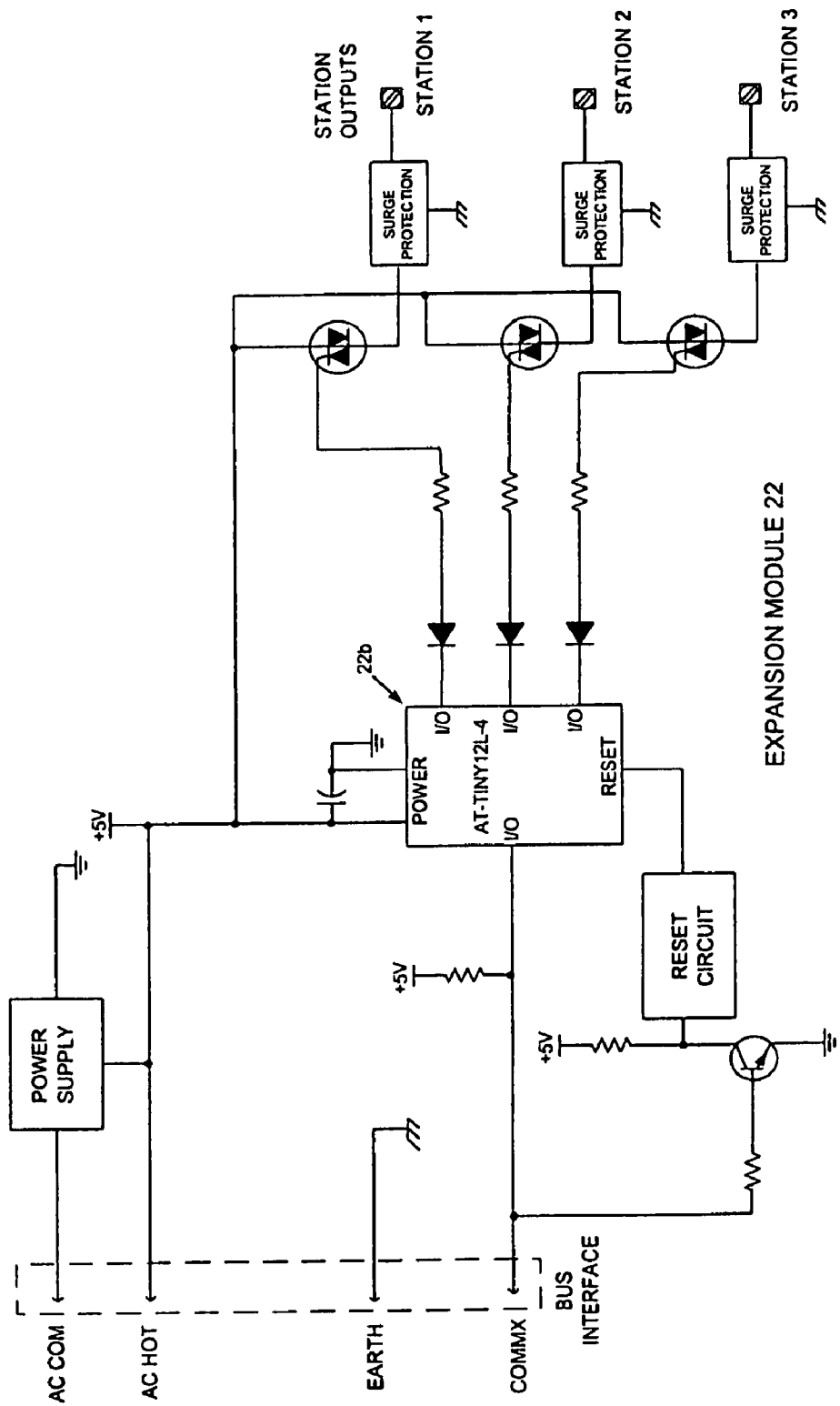
FIG. 13 is a schematic diagram of one embodiment of the expansion module circuit.
Figure 15:
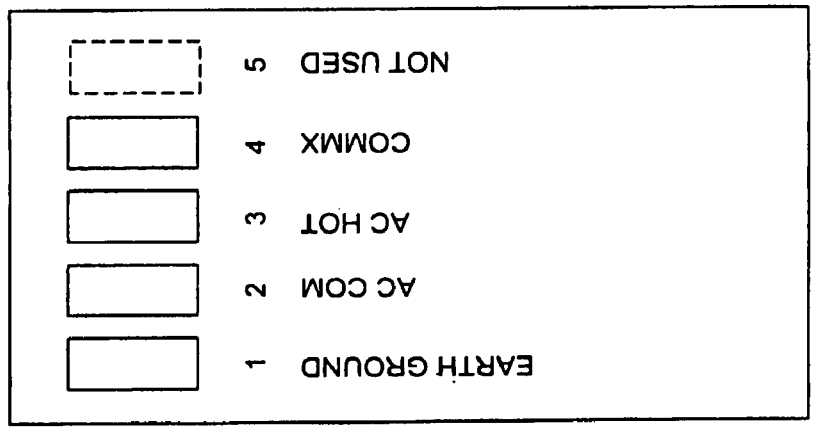
FIG. 15 is a block diagram representation of the expansion module indicating the configuration of the pins.

As shown in FIGS. 13 and 15, the set of spring finger contacts 45 for coupling the expansion modules 22 to the corresponding set of connector pins 45A of the back plane 51 herein include two AC power line connections, an earth ground line connection, and a data communication signal line connection. The corresponding pin-out of the back plane circuit 51 is illustrated in FIGS. 15 and 17 and the corresponding signals are as follows: 1—EARTH GROUND, 2—AC COM, 3—AC HOT, and 4—COMM-1 (or 2 or 3 depending on which bay 19 the module is positioned in and indicated in FIG. 13 as "COMM X").

The communication between the control panel microcontroller 20c and each of the expansion modules 22 and the smart modules 26 takes place through a serial communication line so that the particular module insertion path 37A-37D into which an expansion or smart module is inserted makes no difference. Thus, if an expansion module in insertion path 37B malfunctions and needs to be replaced, the removal of that module will have no effect on the operation of the remaining modules in insertion paths 37C and/or 37D.

If the control panel Circuit 20b, illustrated in FIG. 18, detects the presence of one or more expansion modules 22, the Control panel microcontroller 20c assigns a default identity to each module and queries the module to identify its functionality. Once in communication, the expansion modules 22 work in concert with the control panel microcontroller 20c to carry out the programmed functions. For example, the expansion modules 22 can inform the base unit 24 of various conditions, such as temperature, humidity, rain gauge readings, moisture of the ground, etc. the base unit 24 also contains the basic irrigation schedules and is programmed to adjust irrigation schedules based on data received from the expansion modules 22. Although the expansion modules 22 enable the base unit 24 to change to permit advanced functions such as adjusting for weather conditions, neither the expansion modules 22 nor the base Unit 24 can adjust or change themselves.

Various smart modules 26 may be used to perform a variety of functions that expand the capabilities of the irrigation controller 10 beyond its basic irrigation functions. In this instance the smart module circuit shown in FIG. 14 includes a microcontroller 22c that is of the same type as that employed in the expansion modules 22. This and other types of microcontrollers can be employed in the smart modules 22, and which could be used, for example, to perform such functions as being a latching solenoid module sending a DC pulse along a wire to a solenoid, a wireless module sending a signal to a valve, a decoder module interpreting a command from the controller 10 that indicates when a valve should turn on/off, an input module accepting inputs from sensors and providing information to the controller 10 about environmental condition, weather, etc., a feature module containing an extra feature such as cycle and soak, etc., an alarming module communicating fault conditions to a homeowner, an alarm company or alike, a fertigation module connecting an automatic fertilization system and allowing the irrigation controller 10 to automate fertilization, an evapotranspiration module receiving evapotranspiration data or weather conditions and allowing the controller 10 to adjust irrigation accordingly, a communication module connecting the controller 10 to other communication channels and/or networks including the internet, etc.

Figure 14:
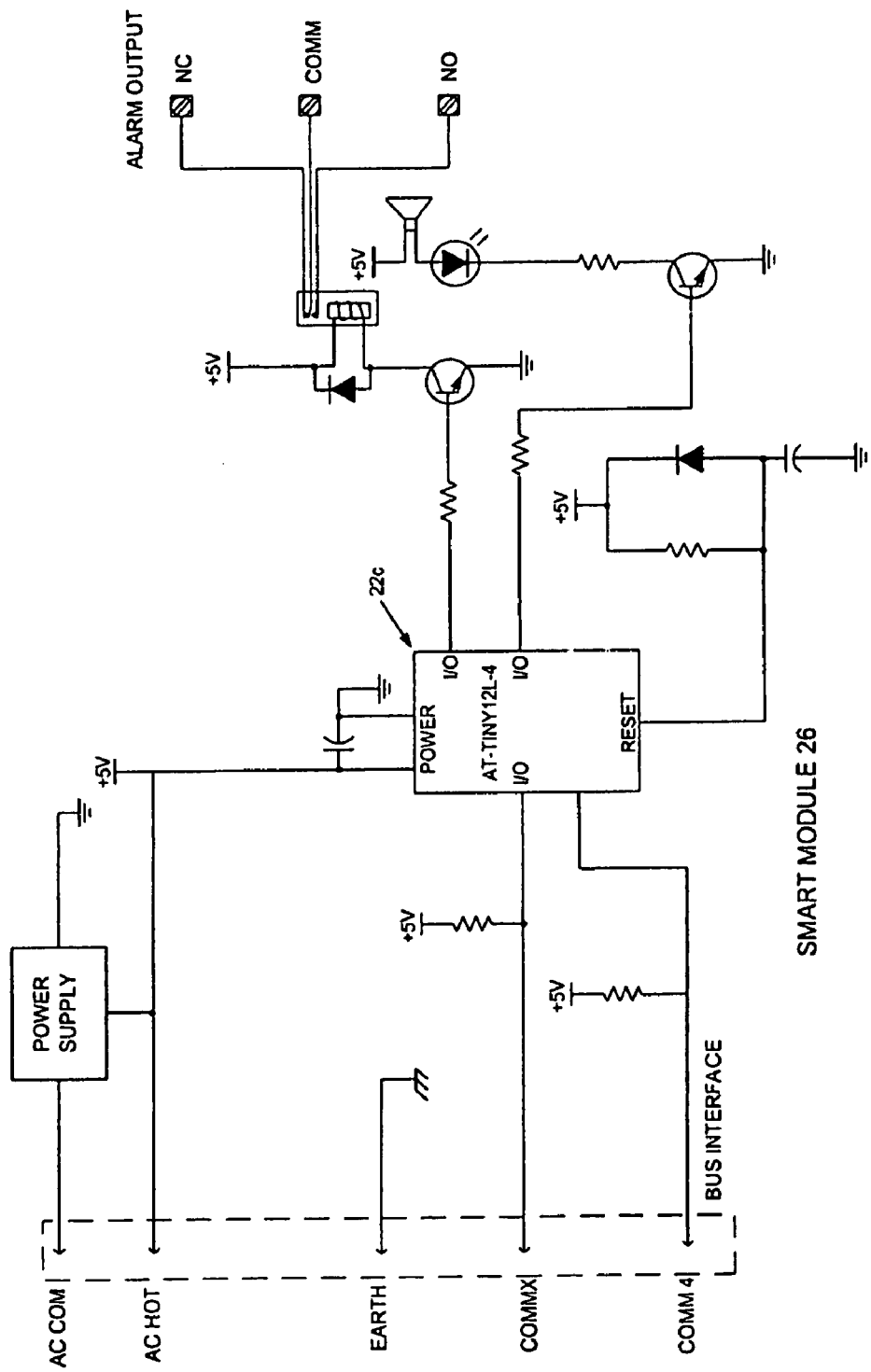
FIG. 14 is a schematic diagram of one form of the smart module circuit.
Figure 16:
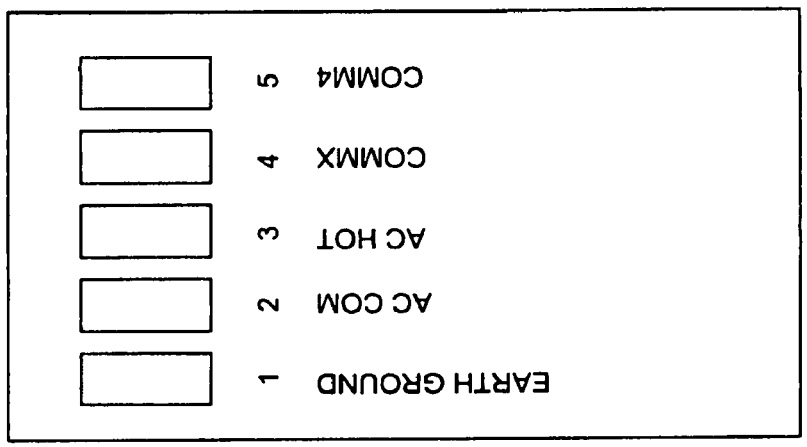
FIG. 16 is a block diagram representation of the smart module indicating the configuration of the pins.

Like the expansion modules 22, the smart modules 26 have a set of conventional spring finger contacts 45 that mate with a corresponding set of conventional connector pins 45A of the backplane circuitry 51. In this instance, as best seen in FIGS. 14 and 16, each smart module 26 includes an earth ground connection, two AC power line connections, and two data communication signal connections. As shown in FIGS. 16 and 17, the complementary set of connector pins 45A of the back plane circuit 51 for the smart module 26 (referred to as "Module 3" in FIG. 17) have pin-outs for the corresponding signals are as follows: 1—EARTH GROUND, 2—AC COM, 3—AC HOT, 4—COMM-X, and 5—COMM-4

The smart modules 26 use a dedicated line, herein designated COMM4, to communicate their presence and identity to the control panel microcontroller 20c. This COMM4 connection is provided in the right-most slot 30D of the base unit 24, so that a module inserted therein has access to this additional communication signal. Smart modules 26 can also utilize the asynchronous serial communication line, COMMX, in a similar manner to the expansion modules 22. In addition, if a Smart module 26 requires extended two-way communications with the base unit 24, it can achieve that through a software-based communications protocol programmed into the microprocessor of the smart module 26 and that of the base unit 24. Moreover, if desired, the backplane circuit board 51 can be modified to include additional bays 19 for receiving additional smart modules 26 simply by adding bays with a COMM-4 communication line for two-way communication with the control panel microcontroller 20c and/or by adding COMM-4 lines to one or more of the bays 19 in which expansion modules 22 are mounted.

Notably, the expandable architecture modular design according to several embodiments allows the communication between the smart modules 26 and the base unit 24 such that all smart functions are carried out in the smart modules 26 rather than the base unit 24. The smart modules 26, herein having circuitry as shown in FIG. 14, allow the abilities of the base unit 24 to be upgraded to include new and different functions without requiring the replacement of the base unit 24. For example, the smart modules 26 provide flexibility by allowing the base unit 24 to interface with an outside user, such as a home security company, to alert the outside user if a sprinkler is not working. The smart modules 26 may be programmed so as to provide an alert that there is a bad solenoid because a valve did not activate. In the case of automatic fertilization, the smart modules 26 could interface with a, homeowner, gardener, etc. to provide an update on conditions.

To guard against the failure of the control panel microcontroller 20c, a mechanism is in place that allows both the expansion modules 22 and the smart modules 26 to be aware of such failures. The control panel microcontroller 20c communicates with the modules on a frequent basis. This allows a module to detect the loss of communication. In effect, this action is similar to that of a watchdog timer. While the control panel microcontroller 20c is active, the expansion modules 22 execute the commands as received in real time from the control panel microcontroller 20c. However, should there be a communication gap greater than expected, the expansion modules' microcontrollers 22b interpret this as a control panel microcontroller 20c failure and immediately shut down any watering activities or other functions until the watchdog conditions have been properly restored. For each command sent to the expansion modules 22, the expansion modules 22 respond with an acknowledgment. Absence of this acknowledgment informs the control panel microcontroller 20c that the module has suffered a hardware or software failure. Notably, it makes no difference into which bay 19 an expansion module 22 is positioned, nor to which of the output terminals 27 irrigation station wires are connected. The microcontroller 20c of the control panel 20 monitors the bays 19 for the presence or absence of expansion modules 22, and cooperates with the microcontrollers 22b of the expansion modules to send control signals only to those irrigation stations detected. In this manner, there is no requirement that any particular bay 19 include an expansion module 26, thus allowing the user to add or remove modules in random order, even while the controller 10 is on and active.

In addition to the normal irrigation program set, labeled A, B & C and stored in non-volatile EEPROM 44, the Controller 10 also contains a contractor's default program set. This contractor's default program set is stored at a separate location in non-volatile EEPROM 44. Irrigation programs for A, B & C are entered through the User Interface 29. A menu choice is available to store this set of irrigation programs into the EEPROM 44 as a contractor's default program set. Thereafter, the user may make changes to the programs A, B & C without concern about making irrigation program mistakes since there is a backup copy. In addition, a knowledgeable irrigation expert can enter a set of programs and store them as the contractor's default program set. A menu choice is available to recall the contractor's default program set from the EEPROM 44 and replace the normal irrigation program set A, B & C. This allows the user to quickly and easily restore a known working irrigation schedule. Other irrigation controllers in the industry have a set of factory defaults with fixed program settings, but do not have the ability to store and recall a set of irrigation programs customized for each individual site.

The above-described embodiments of the present invention are for illustration only and not limiting. It will thus be apparent to those skilled in the art that various changes and modifications may be made without departing from the spirit and scope of the invention as defined in the appended claims.

What is claimed is:

1. An irrigation controller comprising:
   a housing;
   a control unit within the housing, the control unit including a first microcontroller for executing stored irrigation programs;
   a plurality of module coupling locations, each electrically coupled with the first microcontroller and adapted to receive one of a plurality of expansion modules; and
   an expansion module removably coupled to a respective module coupling location and including a second microcontroller capable of communicating with said first microcontroller and including driver circuitry for actuating irrigation valves, the second microcontroller capable of operating the driver circuitry for actuating said irrigation valves in accordance with control signals received from the first microcontroller, wherein the expansion module may be electrically coupled and decoupled to the respective module coupling location without removing power to the control unit.

2. The irrigation controller of claim 1 wherein the first microcontroller is configured to handle dynamic electrical connection and electrical disconnection of the expansion module without restarting the control unit.

3. The irrigation controller of claim 1 wherein each of the plurality of module coupling locations provides power and data such that a power circuit connection is established prior to a data circuit connection being established upon the coupling of the expansion module thereto, and
   wherein the power circuit connection is terminated after the data circuit connection is terminated upon the uncoupling of the expansion module therefrom.

4. The irrigation controller of claim 1 wherein the expansion module may be electrically coupled and decoupled to the respective module coupling location during operation of the controller.

5. The irrigation controller of claim 1 wherein the respective module coupling location may be any one of the plurality of module coupling locations independent of the coupling of another of the plurality of expansion modules to another of the plurality of module coupling locations.

6. The irrigation controller of claim 1 further comprising a smart module removably coupled to another respective module coupling location, said smart module having a third microcontroller capable of communicating with said first microcontroller and operating together with said first microcontroller to control the operation of a variety of irrigation functions that can not be performed by the first microcontroller and the expansion module.

7. The irrigation controller of claim 1 wherein the first microcontroller is configured to handle dynamic electrical connection and electrical disconnection of the expansion module without restarting firmware of the control unit.

8. The irrigation controller of claim 1 wherein the first microcontroller is configured to repeatedly verify that the expansion module is coupled to the module coupling location.

9. The irrigation controller of claim 1 wherein the first microcontroller is configured to repeatedly verify that the expansion module is coupled to the module coupling location.

10. An irrigation controller comprising:
    a housing;
    a control unit within the housing, the control unit including a first microcontroller for executing stored irrigation programs;
    a plurality of module coupling locations, each electrically coupled with the first microcontroller and adapted to receive one of a plurality of expansion modules; and
    wherein the first microcontroller is configured to detect the electrical coupling and decoupling of an expansion module to a respective module coupling location without removing power to the control unit, the expansion module including a second microcontroller capable of communicating with said first microcontroller and including driver circuitry for actuating irrigation valves, the second microcontroller capable of operating the driver circuitry for actuating said irrigation valves in accordance with control signals received from the first microcontroller.

11. The irrigation controller of claim 10 wherein the first microcontroller is configured to handle dynamic electrical connection and electrical disconnection of the expansion module without restarting the control unit.

12. The irrigation controller of claim 1 wherein each of the plurality of module coupling locations provides power and data such that when the expansion module is coupled to the respective module coupling location, a power circuit connection is established prior to a data circuit connection being established upon the coupling of the expansion module thereto, and
    when the expansion module is uncoupled from the respective module coupling location, the power circuit connection is terminated after the data circuit connection is terminated.

13. The irrigation controller of claim 10 wherein the first microcontroller is configured to allow the expansion module to be electrically coupled and decoupled to the respective module coupling location during operation of the controller.

14. The irrigation controller of claim 10 wherein the respective module coupling location may be any one of the plurality of module coupling locations independent of the coupling of another of the plurality of expansion modules to another of the plurality of module coupling locations.

15. The irrigation controller of claim 10 wherein the first microcontroller is configured to allow a smart module to be removably coupled to another respective module coupling location, said smart module having a third microcontroller capable of communicating with said first microcontroller and operating together with said first microcontroller to control the operation of a variety of irrigation functions that can not be performed by the first microcontroller and the expansion module.

16. The irrigation controller of claim 10 wherein the first microcontroller is configured to handle dynamic electrical connection and electrical disconnection of the expansion module without restarting firmware of the control unit.

17. The irrigation controller of claim 10 wherein the first microcontroller is configured to repeatedly verify whether or not the expansion module is coupled to the module coupling location.

18. The irrigation controller of claim 10 wherein the first microcontroller is configured to repeatedly verify, for each station of a plurality of stations controlled by an irrigation program, each station corresponding to a valve, that a respective expansion module having an output controlling each station is coupled to a respective module coupling location.

19. A method for use in irrigation control comprising:
operating an irrigation controller having a control unit within a housing, the control unit including a first microcontroller for executing stored irrigation programs, the irrigation controller having a plurality of module coupling locations, each electrically coupled with the first microcontroller and adapted to receive one of a plurality of expansion modules; and detecting an electrical coupling and decoupling of an expansion module to a respective module coupling location without removing power to the control unit, the expansion module including a second microcontroller capable of communicating with said first microcontroller and including driver circuitry for actuating irrigation valves, the second microcontroller capable of operating the driver circuitry for actuating said irrigation valves in accordance with control signals received from the first microcontroller.

20. The method of claim 19 wherein the detecting step comprises detecting dynamic electrical coupling and decoupling of an expansion module to a respective module coupling location without restarting the control unit.

* * * * *